United States Patent
Yoshida

Patent Number: 6,138,340
Date of Patent: *Oct. 31, 2000

[54] DEVICE FOR INSERTION AND ASSEMBLY OF WORKPIECES AND THE METHOD THEREOF

[75] Inventor: Hiroshi Yoshida, Kumamoto, Japan

[73] Assignee: Hirata Corporation, Tokyo, Japan

[*] Notice: This patent is subject to a terminal disclaimer.

[21] Appl. No.: 09/311,138

[22] Filed: May 13, 1999

Related U.S. Application Data

[63] Continuation-in-part of application No. 08/968,303, Nov. 12, 1997, abandoned.

[30] Foreign Application Priority Data

May 13, 1997 [JP] Japan ................................. 9-139424

[51] Int. Cl.[7] ............................................... B23Q 3/00
[52] U.S. Cl. .............................. 29/468; 29/281.5; 29/714
[58] Field of Search ................................ 29/240, 281.5, 29/434, 464, 468, 714, 893.1

[56] References Cited

U.S. PATENT DOCUMENTS

| | | | |
|---|---|---|---|
| 4,177,548 | 12/1979 | Yarick et al. . | |
| 4,480,381 | 11/1984 | Collet et al. . | |
| 4,538,333 | 9/1985 | Cettl | 29/240 |
| 4,794,690 | 1/1989 | Yamanaga et al. . | |
| 4,887,344 | 12/1989 | Kuihara et al. . | |
| 5,086,555 | 2/1992 | Broadway et al. | 29/714 |
| 5,105,516 | 4/1992 | Enomoto et al. | 29/281.5 |
| 5,189,785 | 3/1993 | Inoguchi et al. | 29/809 |
| 5,459,918 | 10/1995 | Uchida et al. | 29/434 |
| 5,511,300 | 4/1996 | Merz et al. . | |
| 5,619,782 | 4/1997 | Tanaka et al. . | |
| 5,718,043 | 2/1998 | Pearson . | |
| 5,794,339 | 8/1998 | Pearson et al. . | |
| 5,974,650 | 11/1999 | Kawabata et al. | 29/468 |

FOREIGN PATENT DOCUMENTS

| | | |
|---|---|---|
| 4141275 | 6/1993 | Germany . |
| 61-79530 | 4/1986 | Japan . |
| 63-77614 | 4/1988 | Japan . |
| 1-210232 | 8/1989 | Japan . |
| 6-218634 | 9/1994 | Japan . |

*Primary Examiner*—David P. Bryant
*Assistant Examiner*—Essama Omgba
*Attorney, Agent, or Firm*—Burns, Doane, Swecker & Mathis, LLP

[57] ABSTRACT

The device for insertion and assembly of workpieces relating to the present invention is a device for insertion and assembly of workpieces for insertion and assembly of a first workpiece to a positioned second workpiece, and comprises means for advancing and retreating which causes the advance and retreat of the first workpiece toward said second workpiece, and means for rotating to rotate either workpiece around an axis Z being a line extending in the direction of advance and retreat of the first workpiece with respect to said second workpiece; wherein said means for advancing and retreating comprises a slider supported advanceably and retreatably with respect to the second workpiece by a body portion, means for holding connected to said slider and holding the first workpiece, and means for applying resilient energy to provide a prescribed resilient energy between the slider and said means for holding. Production costs can be greatly reduced and the device as a whole is made lightweight and compact, while having a great capacity to correspond to machine type regardless of workpiece type and model, etc., and enabling the simple and mathematical setting of conditions, even for workpieces with different assembly conditions.

10 Claims, 15 Drawing Sheets

FIG. 1

DEVICE FOR INSERTION AND ASSEMBLY OF WORKPIECES AND THE METHOD THEREOF

This is a continuation-in-part application of U.S. patent application Ser.No. 08/968,303 filed on Nov. 12, 1997 entitled "DEVICE FOR INSERTION AND ASSEMBLY OF WORKPIECES AND THE METHOD THEREOF" now abandoned.

BACKGROUND OF THE INVENTION

1. Field of the Invention

The present invention relates to a device for insertion and assembly of workpieces and the method thereof used when effecting the assembly of a workpiece to a workpiece in assembly lines for drive units, various types of precision machinery, automobiles, etc.

2. Description of the Related Art

Before now, the device disclosed in Japanese Patent No. 8-215947 was known as a device for assembling a torque converter in a transmission, in the assembly of automatic transmissions for automobiles, for example. This device prevents the co-rotation of the axial shaft of the torque converter and the spline axis of the transmission and effects the fitting together of the workpieces in a short period of time. For this reason, it is equipped with the following: means for driving tables fore and aft to support tables which move fore and aft, such as a mobile plate and an insertion plate, approachably and retreatably with respect to one workpiece, and to move these tables which move fore and aft, means for holding a workpiece to hold the other workpiece installed on these mobile tables, means for rotating workpiece to rotate either workpiece when fitting said pair of workpieces, and means as a pusher cylinder for advancing and retreating workpieces for fine movement of one workpiece in a direction away from the other workpiece when fitting said pair of workpieces.

In the conventional device, automatic assembly is effected as a drive cylinder 51 moves mobile and insertion plates 47 and 48 close together in the direction of the torque converter and drives a rotary unit 102 arranged so as to straddle the insertion and mobile plates, the torque converter is rotated and centered, the insertion cylinder 54 installed on the side toward the mobile plate is driven and the insertion plate 48 is moved with respect to the mobile plate, and the position of the insertion plate 48 approaching the torque converter is detected, meanwhile the pusher cylinder 57 is moved fore and aft and the action of finding the fitting position is effected. However, this device requires the drive cylinder 51, insertion cylinder 54, and pusher cylinder 57 for just advancing and retreating movement of one workpiece with respect to another workpiece; control becomes complex which affects costs and results in decreased precision due to a plurality of cylinder mechanisms. Moreover, the device becomes large and heavy and manufacturing costs are high because these cylinder mechanisms are in a state of being mounted on a plurality of tables and driving is effected for each table. Another disadvantage is the problem of precision. Furthermore, with this conventional device, the minimum number of cylinders is three due to the use of driving cylinders all using air pressure in order for the advancing and retreating movement. Otherwise, solenoid valves for driving cylinders, regulators for air pressure control, and solenoid valves to control that, etc., become necessary, the number of parts used for driving becomes high, and control becomes complex. Meanwhile, problems with the conventional device include: control of position and control of pressure both become—necessary because it is the amount of advancing and retreating movement of the cylinders which produces the fitting, or not, of one workpiece to another; and in practice, it is difficult to effect the fitting of spline and engagement axis so smoothly because it is determined whether both workpieces are in contact or not through detecting the position with sensors and either workpiece is rotated when in a state of contact under the fixed pressing force from the cylinders. Furthermore, another problem is that the workpiece of setting the conditions is very difficult and lacking in flexibility because, when effecting various settings in the assembly workpiece with the conventional device, insertion speed and rotation speed are different depending on the type and model of workpiece and the control of two systems, the control of pressure, and the control of position, must be effected at the same time.

SUMMARY OF THE INVENTION

The present invention was developed in view of the foregoing problems; an object of the present invention is to provide a device for insertion and assembly of workpieces and the method thereof which can greatly reduce manufacturing costs and wherein the device as a whole is made lightweight and compact, while having a great capacity to correspond to machine type regardless of workpiece type and model, etc., and enabling the simple and mathematical setting of conditions, even for workpieces with different fitting depths and other assembly conditions. A further object of the present invention is to provide a device for insertion and assembly of workpieces and the method thereof which can smoothly effect assembly workpiece, reduce the cycle time in the assembly process, and greatly reduce total working time. Another object of the present invention is to provide a device for insertion and assembly of workpieces and the method thereof which can greatly improve action precision at the same time as attaining the simple setting of conditions.

In order to attain these objects, the present invention is a device for insertion and assembly of workpieces for insertion and assembly of a first workpiece 12 to a positioned second workpiece 14; it is constituted of a device for insertion and assembly of workpieces 10 comprising means for advancing and retreating 20 causing the advance and retreat of the first workpiece 12 toward said second workpiece 14 and means for rotating 26 to rotate either workpiece around an axis Z being a line extending in the direction of advance and retreat of the first workpiece 12 with respect to said second workpiece 14, and wherein said means for advancing and retreating 20 comprises a slider 22 supported advancably and retreatably with respect to the second workpiece 14 by a body portion 18, means for holding 24 connected to said slider 22 and holding the first workpiece 12, and means for applying resilient energy 42 to provide a prescribed resilient energy between the slider 22 and said means for holding 24.

Also, said slider 22 may be installed lengthwise in the form of a rail or cylinder; said means for holding 24 may be connected on the side toward one end of the slider 22.

Also, the device for insertion and assembly of workpieces relating to the present invention may be constituted with said first and second workpieces 12 and 14 comprising insertion fitting portions R, S, and T to be inserted together in the direction of insertion depth; means for detecting 92 to detect the presence of a fit with said insertion fitting portions being installed; and a mechanism for detecting fitting position 76 causing the synchronized forward movement toward the second workpiece 14 of said means for detecting 92 itself, in a linkage with the forward movement of said first workpiece 12 due to said means for advancing and retreating 20, while causing said means for detecting 92 to be fixed at an arbitrary standard position, releasing the link between the first workpiece 12 and said means for detecting 92, and causing the advance of only the first workpiece 12.

Also, the device for insertion and assembly of workpieces of the present invention may be equipped with a mechanism for advancing, retreating, rotating, and maintaining 59, which supports said means for holding 24 rotatably, while withdrawing said means for holding 24 and guiding and maintaining it advancably and retreatably with respect to said slider 22.

Also, the device for insertion and assembly of workpieces of the present invention may be such that the standard detection position of means for detecting 92, corresponding to said insertion fitting portions R, S and T, may be a position more displaced in the direction of the insertion depth than the initial contact position R1, S1, and T1 for each of the insertion fitting portions R, S, and T.

Also, said means for advancing and retreating 20 may comprise a numerically controllable control motor 28 and means for converting to convert the rotary force of the control motor 28 into linear motion.

Furthermore, the present invention comprises the method for insertion and assembly of workpieces to connect said means for holding 24, to hold the first workpiece 12, to the slider 22 which moves advancably and retreatably with respect to the positioned second workpiece 14, so as to provide the prescribed resilient energy between said means for holding 24 and the slider, and to assemble a first workpiece 12 with respect to a second workpiece 14 while advancing the first workpiece 12 with respect to the second workpiece 14 while rotating it around an axis being the axial Z line in the direction of advancing and retreating, in the state where the resilient energy is applied.

Also, the method for insertion and assembly of workpieces of the present invention may be such that the assembly of the first workpiece to the second workpiece is effected as follows: said means for detecting 92 is moved in the same direction as this first workpiece 12 in synchronization with the forward movement of said first workpiece 12 toward the second workpiece 14; the standard detection position of said means for detecting 92 is set to the initial contact position R1, S2, and T1 of each insertion fitting portion R, S, and T, or at positions in the vicinity thereof, being a plurality of levels established in the direction of insertion depth of the first and second workpieces 12 and 14; and the first workpiece 12 only is moved forward and rotated, while the advance and stoppage of said means for detecting 92 in the same direction as the first workpiece 12 is effected, in a state where only said means for detecting 92 is stopped at said standard position.

The device for insertion and assembly of workpieces of the present invention is a device for insertion and assembly of workpieces for insertion and assembly of a first workpiece to a positioned second workpiece; it comprises means for advancing and retreating causing the advance and retreat of the first workpiece toward said second workpiece and means for rotating to rotate either workpiece around an axis being a line extending in the direction of advance and retreat of the first workpiece with respect to said second workpiece, and wherein said means for advancing and retreating comprises a slider supported advancably and retreatably with respect to the second workpiece by a body portion, means for holding connected to said slider and holding the first workpiece, and means for applying resilient energy to provide a prescribed resilient energy between the glider and said means for holding. Said means for holding is installed in a state of being apart from the slider on the end most side of the slider which advances and retreats with respect to the second workpiece and said means for applying resilient energy, to generate resilient energy when the slider presses the second workpiece, is interposed between the slider and said means for holding. This makes it possible that the phases agree at a closest position of coincidence and that precise fitting can be effected, because the action of insertion and fitting while advancing and retreating or rotating the first workpiece is effected in a state where elastic pressure is continually applied toward the second workpiece. Consequently, the time from start until fitting is short and the shortening of the cycle time is realized. At the same time, fitting can be controlled by just controlling the position of the slider because energy is applied due to the advance of the slider. Setting conditions such as for device startup or changing the initial setup, or design and manufacturing are very simple and smooth. Said means for applying resilient energy may be of rubber or another elastic element, but a spring is best. The support mount to support the forward and backward motion of the slider may be in a direction intersecting with the direction of the Z axis or it can move in the X and Y directions, up and down, as well. Said means for holding is optimally an air chuck type which is driven by negative air pressure, but is not limited to this type. Said means for holding may also hold the workpiece mechanically; its actual constitution may be determined arbitrarily. The driving force for driving the advance and retreat may be such that it can control and vary position control for advancing and retreating or forward and backward motion to an arbitrary position. A servo motor, as an electronic actuator, is optimum. A motor, being an alternating current, direct current, DC brushless, stepping motor, or other servo mechanism, may be used. The action of applying pressing force and advancing and retreating the workpiece, while rotating the workpiece, may be effected; or when there is not fitting, the action of drawing back the first workpiece once, rotating it at a small angle, bringing it close, and moving it forwards and backwards may be effected once or repeated a plurality of times. Because the insertion fitting portions are different for each workpiece, this may be effected in the case of only a first step, or a second, third, fourth, or other arbitrary fitting position may be set. The setting of the detection standards for fitting is arbitrary. For example, in the case where there are four stages of insertion fitting positions overall, the device may be made to stop the advancing and retreating and retry when the first, second, and third steps are fit one time, to stop advancing and retreating and retry when the first and second steps are fit one time, or to effect insertion and fitting while effecting the fitting for each step and stopping.

Also, said slider may be installed lengthwise in the form of a rail or cylinder; said means for holding may be connected on the side toward one end of the slider. The constitution of the slider does not need to be in this long form, but by having it in a long tubular form, said means for rotating and, as necessary, said means for advancing and retreating can be enclosed within; because the whole thing then advances and retreats in a state of having said means for holding at one end, the size of the entire device becomes compact and it can therefore be made lightweight. Also, the workpiece space can be made small and working space can be used more efficiently because the action of inserting and assembling workpieces can be effected at an aerial position above the ground. This slider may be considered as a rail or cylinder, or as a type of axis. For example, by connecting said means for holding to the end portion on the side of the slider which retreats and advances and positioning said means for holding so that it is concentric to the central axis of the slider, and advancing or retreating the slider with respect to the other workpiece, the device can be made both compact and lightweight and to easily effect the action of inserting with respect to another workpiece to be assembled.

It is optimum that the first and second workpieces have insertion fitting portions to be fit together in the direction of insertion depth; said means for detecting to detect the presence of fitting to said insertion fitting portions is installed; and a mechanism for detecting fitting position causing the synchronized forward movement toward the second workpiece of said means for detecting itself, in a linkage with the forward movement of said first workpiece due to said means for advancing and retreating, while causing said means for detecting to be fixed at an arbitrary standard position, releasing the link between the first workpiece and said means for detecting, and causing the advance of only the first workpiece. The mechanism for moving forward said means for detecting itself to move in synchronization with the first workpiece is simple and preferable if, as in the embodiment, it is a combination of a brake mechanism and a stopper mechanism with a collar. Otherwise, a plurality of brake devices may be combined and controlled or the action of said means for detecting may be controlled with a combined action using a plurality of guide shafts. A contact sensor such as conductive rubber or a limit switch may be used for the sensor as said means for detecting because the detection and control of the amount of movement of the slider supporting the workpiece is possible when the resilient energy is applied and adjusted using one guide shaft. Optimally this is a proximity sensor; a sensor which is an exciting coil, a photoelectric type, a capacitance type, an ultrasonic type, an air pressure type, or another type of sensor may be used. The device for insertion and assembly of workpieces may be equipped with a mechanism for advancing, retreating, rotating, and maintaining, which supports said means for holding rotatably, while withdrawing said means for holding and guiding and maintaining it advancably and retreatably with respect to said slider.

The standard detection position of means for detecting, corresponding to said insertion fitting portions, is preferably a position more displaced in the direction of the insertion depth than the initial contact positions for each of the insertion fitting portions. The standard detection position becomes the position where spring force is applied; the insertion and fitting of the first workpiece is easily done due to the advancing and retreating and rotary action of the first workpiece in a state where pressing force is applied. The actual displaced positions may be set arbitrarily. The greater the amount of displacement, the greater the resilient energy, specifically pressing force.

Said means for advancing and retreating optimally comprises a numerically controllable control motor and means for converting to convert the rotary force of the control motor into linear motion. The constitution may be such that said means for rotating, etc., is housed in the rail-shaped or cylindrical slider and the entirety advances and retreats on the side toward another workpiece to be assembled.

BRIEF DESCRIPTION OF THE DRAWINGS

FIG. 1 is a front view which is a cross section of the principal elements of the device for insertion and assembly of workpieces relating to the embodiment of the present invention;

DESCRIPTION OF THE PREFERRED EMBODIMENTS

Below, the preferred embodiment of the present invention is explained with reference to the appended drawings. The embodiment shows an example of the device for insertion and assembly of workpieces applied to the assembly of a torque converter and transmission for an automatic transmission of an automobile.

Figure 6:
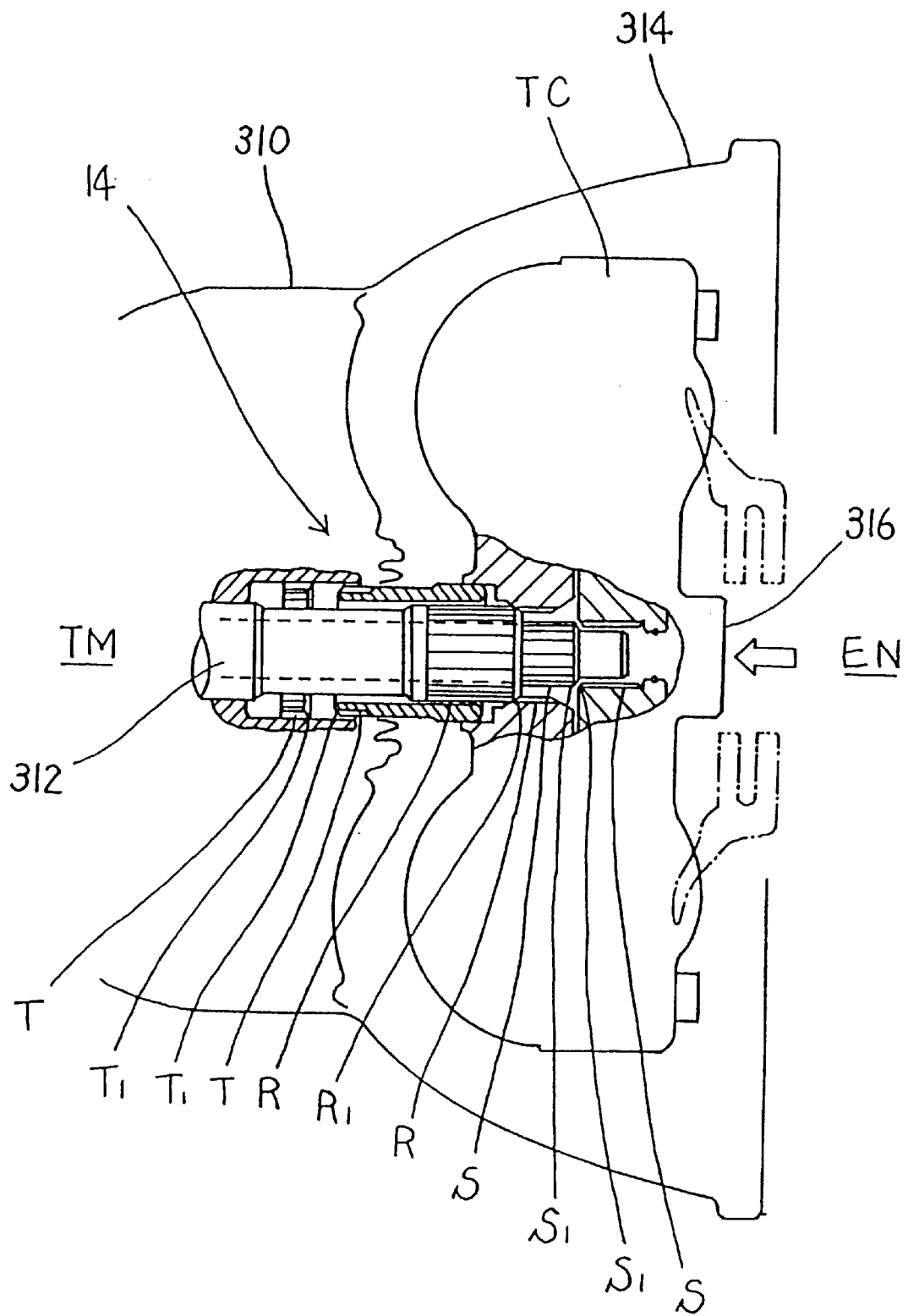
FIG. 6 is an explanatory diagram of the details of principal elements in the state of contact at the positions reached first of the first insertion fitting portion with respect to the output axis of the torque converter.
Figure 7:
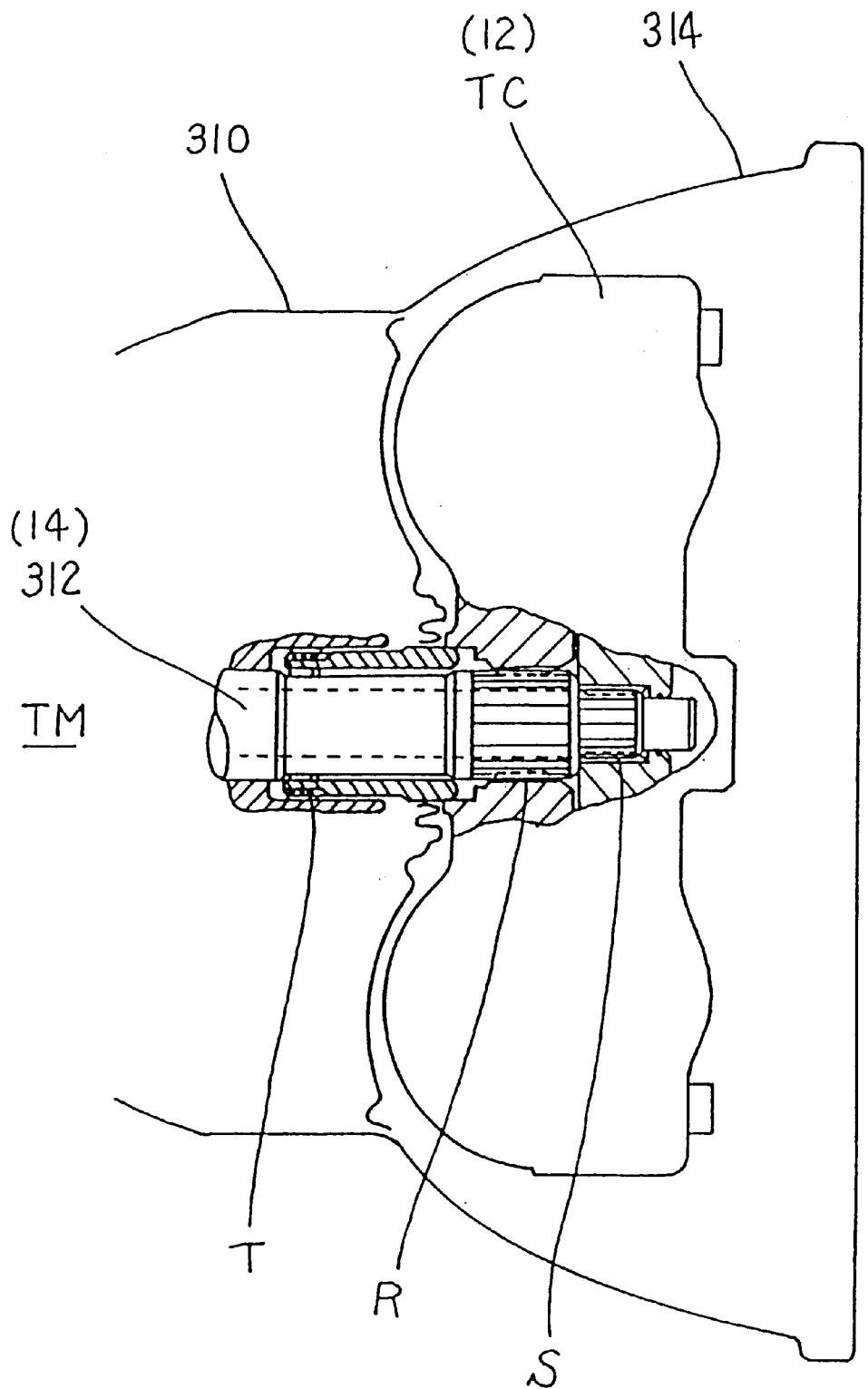
FIG. 7 is an explanatory diagram of the details of principal elements in the state of fitting all insertion fitting portions with respect to the output axis of the torque converter.

In FIG. 7, an output axis 312, for the transmission within the transmission case 310 housing the gear transmission, not pictured, for automatic gear changing interlocked with the fluidic system of the torque converter, is supported rotatably. A converter housing 314 is mounted on the side where said transmission case 310 is connected to the engine EN; as shown in FIG. 6, the torque converter moves inward in the state where the torque converter TC is held inside said converter housing 314 and is inserted and assembled in the output axis 312. An oil pump, not pictured, is attached on the side toward one end of the output axis 312 within the transmission case 310, being the transmission side. A cylindrical boss portion 316 is formed in the central portion on the engine EN side of the housing of the torque converter TC and is connected to the crank axis of the engine. Inside the torque converter TC, the constitution is such that impellers, for example a known pump impeller and turbine impeller, are arranged facing each other in a donut-shaped case and a stator impeller is placed in the central portion. Thus the pump impeller is coupled to the crank shaft of the engine while the turbine impeller is coupled to the output axis 312 and connected to the gear-type transmission. Therefore the engine driving force turns the pump impeller, causes the turbine impeller to rotate due to the fluid viscosity within, and causes torque to be transmitted to the output axis 312.

In the embodiment, first second and third insertion fitting portions R, S, and T in three locations and comprising a spline and spline bearing are established between the torque converter TC and the output axis 312; when the torque converter TC is held and attached from the engine side, the fitting portions cause the phases of the spline and spline bearing to coincide and cause spline fitting, thereby the torque converter TC is assembled with respect to the transmission TM. In this embodiment, the output axis 312 protruding into the converter housing 314 is the second workpiece 14 and the torque converter TC, being inserted and fit towards this output axis 312, is the first workpiece 12.

Figure 1:
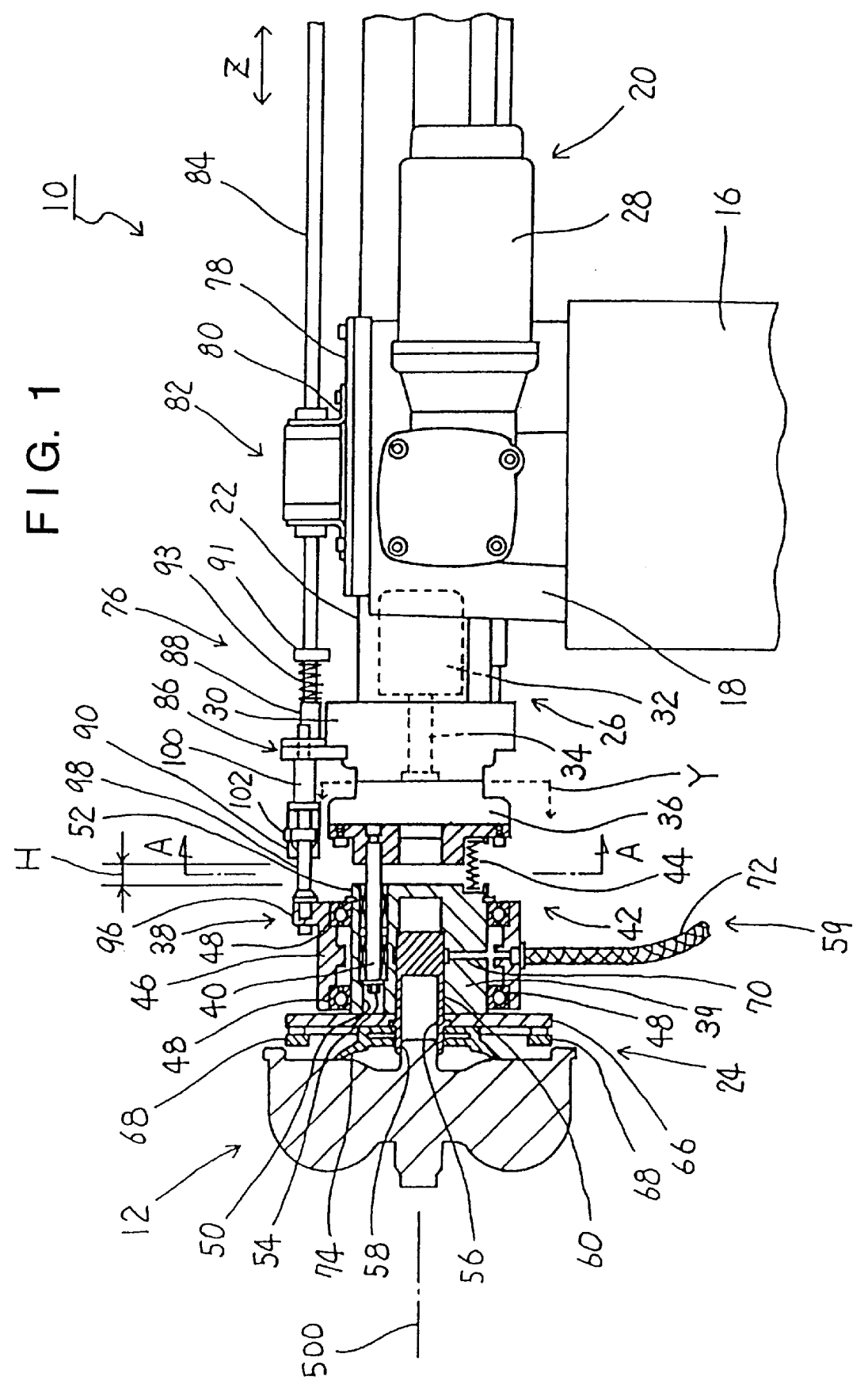
Figure 2:
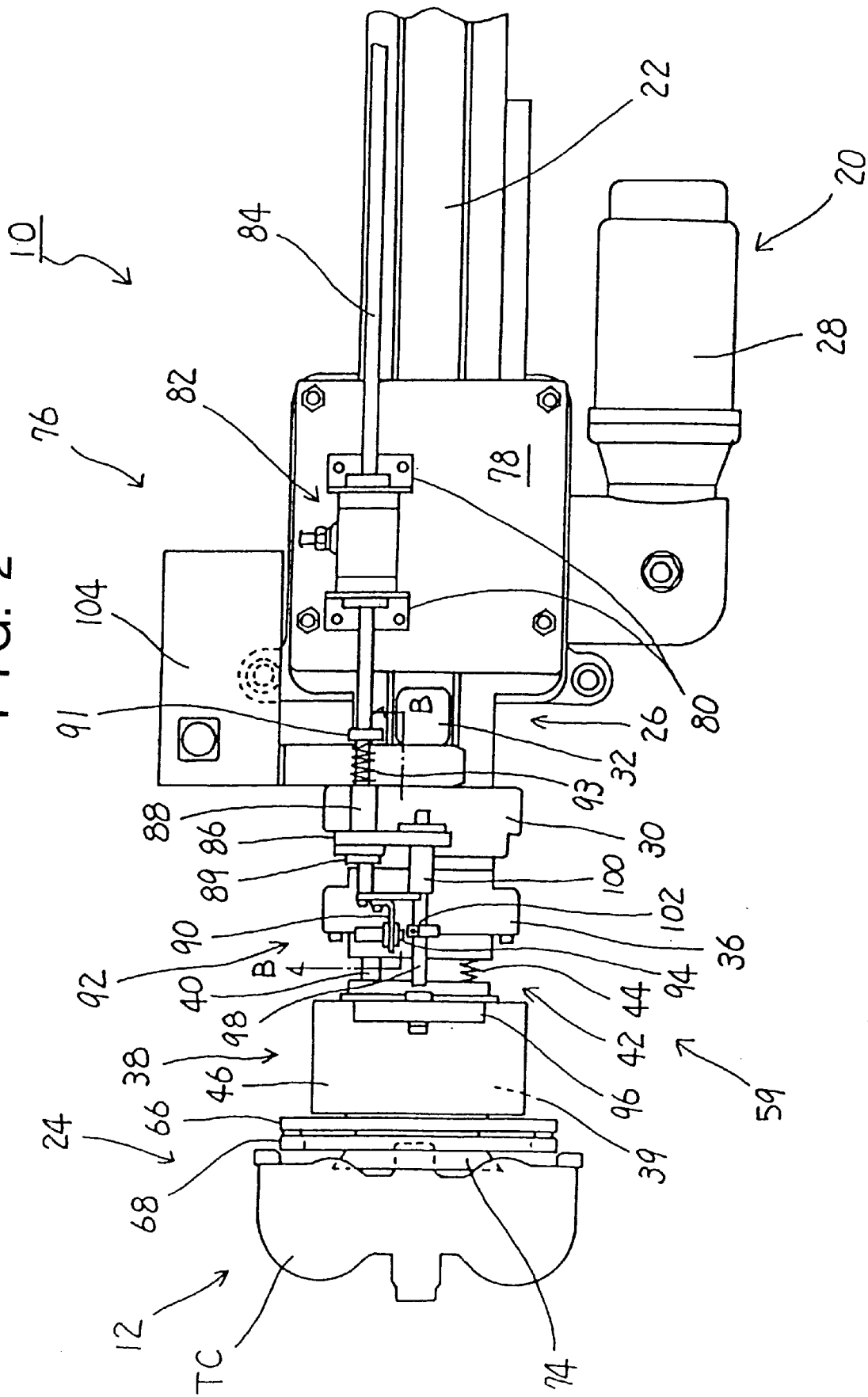
FIG. 2 is a plane diagram thereof.

FIG. 1 is a front view with a cross section of the principal elements of the device for insertion and assembly of workpieces relating to the embodiment of the present invention; FIG. 2 is a plane diagram thereof. In the figures, the body portion 18 in the form of a cubic case is affixed on a supporting mount 16. This body portion 18 supports a rail-shaped slider 22 extending from left to right in the figure so that the slider advances and retreats from left to right; means for holding 24 to hold the torque converter TC is connected to one end of said slider 22 (left end in the figure).

The device for insertion and assembly of workpieces 10 comprising means for advancing and retreating 20 causing the advance and retreat of the first workpiece 12 toward the positioned second workpiece 14 and means for rotating 26 to rotate either workpiece around an axis being a line extending in the direction of the advancing and retreating motion of the first workpiece 12 with respect to said second workpiece 14, and wherein said means for advancing and retreating 20 comprises a slider 22 supported advancably and retreatably with respect to the second workpiece 14 by a body portion 18, and means for holding 24 connected to said slider 22 and holding the first workpiece 12.

In the figure, the body portion 18 houses a guide rail mechanism to guide the slider 22 in a sliding movement in the direction of the Z axis 500 (in the embodiment, this is right to left; the lengthwise direction of the axis being the line extending in the direction of the advance and retreat of the first workpiece with respect to the second workpiece); the slider 22 is smoothly guided in the direction of the Z axis. In the figure, the slider 22 is established in the form of a rail or cylinder; said means for holding 24 discussed below is connected with flexibility on the side toward one end of this slider. By having the slider in a long form, said means for rotating and, as necessary, said means for advancing and retreating can be enclosed within; because the whole thing then advances and retreats in a state of having said means for holding at one end, the size of the entire device becomes compact and it can therefore be made lightweight. Also, the workpiece space can be made small and working space can be used more efficiently because the action of inserting and assembling workpieces can be effected at an aerial position above the ground.

Also, in FIG. 2, a fore and aft servo motor 28, as the numerically controllable control motor, is installed parallel to the side surface by means of a curved arm portion on said body portion 18; the slider 22 is slid for a numerically controlled and prescribed amount of movement by means of the converter mechanism as said means for conversion to convert the rotation of the motor to a linear motion, such as a reduction gear mechanism or a rack and pinion mechanism, not pictured, and installed in the body portion 18. The appropriate amount of slider movement is get with numerical control using mechanisms with different spring constants; it is therefore simple to effect the movement settings at the time of insertion and assembly of one workpiece to another workpiece; the number of parts of the driving system is greatly reduced and the structure becomes simple.

Also, a cylindrical bearing mount 30 is mounted and affixed on the forward side of the slider 22, specifically the side in the direction where the torque converter TC, as the first workpiece, is faced by said means for holding 24 toward the output axis 312 of the transmission, as the second workpiece. The rotary servo motor 32 is housed inside the slider 22 as shown by the broken line in FIG. 1; its rotary axis 34 protrudes within the bearing hole of the bearing mount 30 and its end protrudes from the forward side; it is pivoted rotatably, according to the broken line arrow Y in FIG. 1, so as to rotate the entirety on the torque converter TC side, excluding the bearing shaft 46. In the embodiment, said means for advancing and retreating 20 comprises a fore and aft servo motor 28 as the numerically controllable control motor and means for converting to convert the rotary power of the control motor to linear motion; said means for rotating 26 includes a rotary servo motor 32.

In FIGS. 1 and 2, the stepped, cylindrical rotary block 36 is affixed on the end of the rotary axis 34 of the rotary servo motor 32 and rotates around the Z axis along with the rotation of the rotary axis 34. A header portion 38 is installed so as to face said rotary block 36 at a prescribed interval H from this rotary block 36. This header portion 38 rotates along with the rotation of the rotary block 36 and is installed so as to slide advancably and retreatably in the direction of the Z axis, specifically the output axis 312 of the transmission TM, with respect to said rotary block 36.

Figure 3:
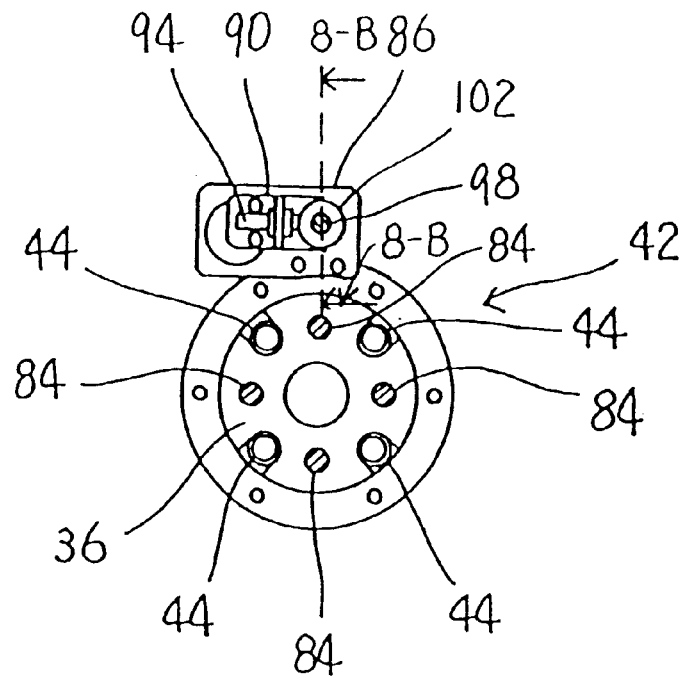
FIG. 3 is a cross section of the end at the line A—A in FIG. 1.
Figure 4:
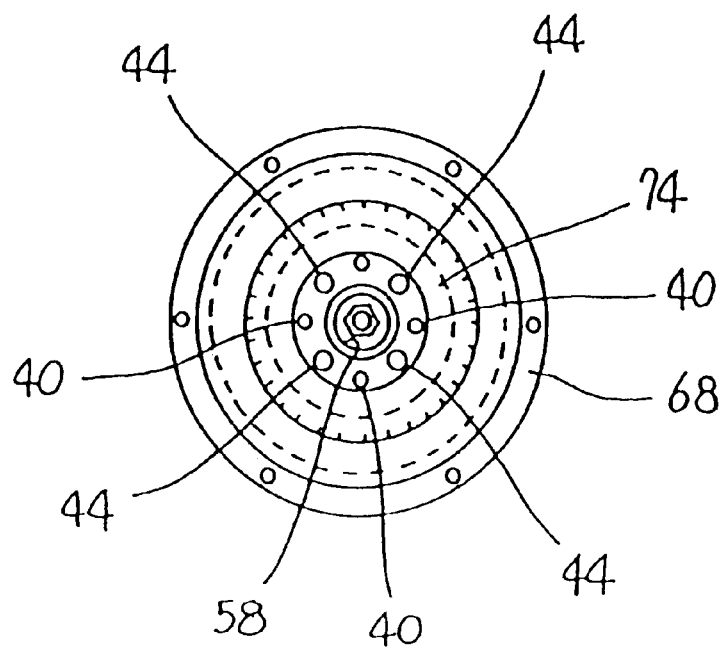
FIG. 4 is a cross section of the end at the header body portion seen from the torque converter side.

As shown in FIG. 3, four support rods 40 are set in the end on the forward side of the rotary block 36 and affixed facing the transmission (second workpiece) at positions forming roughly equal angles in the direction of the periphery. Furthermore, a coil spring 44, as said means for applying resilient energy 42, is mounted in the same way to face the transmission at a position on the periphery, being at the midpoint of each of these support rods 40.

In FIG. 1, a cylindrical bearing tube 46 is arranged on the side toward the transmission TM of the rotary block 36 so as to face the rotary block 36. A plurality of bearings 48 are arranged inside this bearing tube 46; a cylindrical header body 39 is inserted and affixed to the inner ring of these bearings 48 and arranged rotatably with respect to the bearing tube 46 on the outside. Holes 50 for four rods are made in the direction of the axis of the cylinder at positions at roughly equal intervals on the periphery of this header body 39.

Furthermore, translation bearings 52 are placed inside each of these holes 50; four support rods 40 on the side of the rotary block 36 are passed through these bearings so as to be pivoted slidably by these translation bearings 52. The stopper 54 is mounted on the ends of these support rods 40;

the header body 39 becomes able to effect stopping and holding at a prescribed withdrawal position at a position in the direction of withdrawal from the rotary block 36.

Also, as shown in the figures, the surface of the header body 39 opposite to the rotary block 36 is arranged at an interval H from said rotary block 36; it is at this interval H that the coil spring 44 is interposed between the header body 39 and rotary block 36. Therefore, while a necessary resilient energy is generated with the coil spring 44 as said means for applying resilient energy 42 between the slider to support the rotary block 36 and said means for holding 24 discussed below, the header body 39 is supported slidably in the sliding direction of the Z axis by the support rods 40 and while this slidability is maintained, the header body 39 is supported rotatably around the Z axis. Secure and quick spline fitting is realized because said means for holding the torque converter is rotated in a state where this means for applying resilient energy continually applies the necessary pressing force against the second workpiece. Since said means for applying resilient energy is constituted of a spring, for example, pressure can be applied according to the degree of compression of the spring to the torque converter and the pressure can be increased or decreased with the amount of advancing or retreating in the direction of the Z axis of the slider; therefore the insertion speed and rotary speed can be adjusted easily for each workpiece, the subject of assembly, by changing the energy using various springs with different spring constants.

In this way is constituted a mechanism for advancing, retreating, rotating, and maintaining 59, which supports said means for holding 24 rotatably, while withdrawing said means for holding 24 and guiding and maintaining it advancably and retreatably with respect to said slider 22. The mechanism for advancing, retreating, rotating, and maintaining 59 comprises the translation bearings 52, the support rods 40, the bearings 48 and the header body 39. A mechanism to insert and fit the first workpiece in the second workpiece is attained with this mechanism for advancing, retreating, rotating, and maintaining 59, as the slider 22 and said means for holding 24 are supported in a state of being divided and are rotated so that a continual resilient energy is applied and moved slightly forward and backward. A hole 56 facing the slider is made in the central portion of the header body 39 on the side toward the second workpiece. A cylindrical block 60 with a hole to form the hole 58 for determining the position of the torque converter TC is inserted and fixed in this hole 56. The boss portion 316 of the torque converter TC is fit in this hole 58 and precisely determines the position.

Furthermore, a plate 66 is mounted on the side of the header body 39 toward the second workpiece. The protruding edge portion 68 of the first workpiece for surface processing the torque converter (setting the opposing surfaces in the fitting of the torque converter with the transmission, as the other workpiece) is installed on the edge of this plate 66. The protruding edge portion 68 contacts the torque converter TC with outer edges matched and effects surface processing of the outer diameter.

Also, air holes 70 are made in said header body 39; negative pressure is provided to an adhesive pad with a motor to power negative pressure, not pictured, by means of an air hose 72 connected so as to pass through these air holes 70. The adhesive pad 74 connected to the air holes 70 is mounted on the side of said plate 66 toward the second workpiece; it attracts and holds the torque converter TC, as pictured, with the provision of the attractive negative pressure and effects the insertion and assembly of the TC to the transmission. In the embodiment, said means for holding 24 comprises this adhesive pad 74.

In the embodiment in FIGS. 1 and 2, the mechanism to detect fitting position 76 is installed, along with the body portion 18 and slider 22, against the bearing shaft 46. A base 78 comprising a rectangular plate is mounted on the upper surface of the support mount 16. A brake device 82 using air pressure, for example, is installed by means of a mounting bracket 80 on this base 78. Passing through a brake chamber inside this brake device 82, above the slider 22, and parallel to said slider 22 (in other words, in the direction of the Z axis), a guide shaft 84 is installed so as to be horizontally movable. With this brake device 82, said guide shaft 84 is restrained with respect to the body portion 18 in the state where braking is on; the brakes are released when air is supplied within the device and the restraint with respect to the body portion 18 is released; this guide shaft 84 is linked to the slider 22 and advances toward the second workpiece along with said slider 22.

Figure 5:
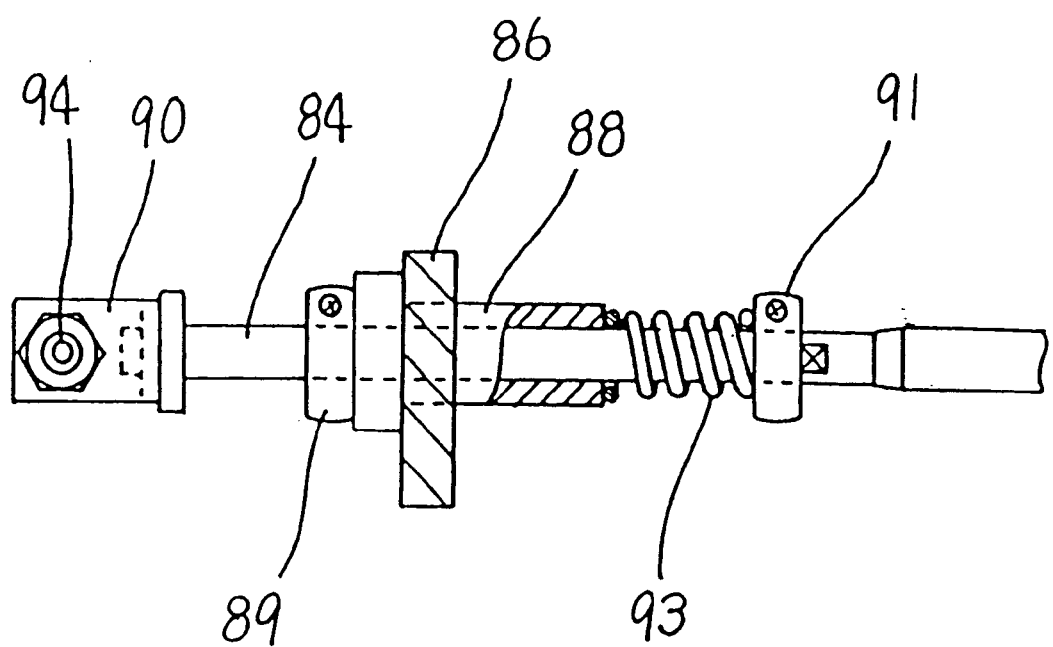
FIG. 5 is an explanatory diagram of the cutaway taken at line 8-B in FIG. 3.

In the figure, a bearing holder 86 is affixed, so as to cross the direction of the Z axis, on the upper surface of the bearing mount 30; it supports the axis established in the direction of the Z axis. The cylindrical portion is protruded to the rear, a flange portion is arranged on the front, and a bush 88 is fit inside one bearing hole of this bearing holder 86. A guide shaft 84 is passed through and pivots inside said bush 88. As seen in FIGS. 2 and 5, it is on the front of the bearing holder 86 that the collar 89 is pierced by and affixed to the guide shaft 84 so as to be adjacent to the bush 88. Therefore, in the case where the brakes of the brake device 82 are not used, when the slider 22 advances toward the second workpiece, it presses this collar 89 in the bearing holder 86 and is moved forward in synchronization, while it is moved freely backwards with respect to the second workpiece. Furthermore, the collar 91 is fixed on the rear side of the bearing holder 86 (side in the direction of withdrawing from the second workpiece); a coil spring 93 is interposed between this collar 91 and the side of the cylindrical end portion of the bush 88; it applies the necessary energy between the bearing holder 86 and the guide shaft 84 and ensures the engaged state without any backlash.

Furthermore, a bracket 90 bent in an L shape is mounted on the protruding end of the bearing holder 86 on the side toward the second workpiece. Furthermore, a proximity sensor 94, as means for detecting 92 is mounted on the end portion of this bracket 90.

Meanwhile, in FIG. 1, a support piece 96 is set facing upwards and protruding from the upper surface of the bearing cylinder 46 which takes in the header body 39. The rod 98 protrudes to the rear from this support piece 96. On the other hand, a hole is made in the bearing holder 86 mounted on said bearing mount 30; a bush 100 is inserted and fit inside this hole. A rod 98 is passed through an axial hole in the center of this bush 100; thereby the rod 98 becomes movable in relation to the bearing holder 86.

In FIGS. 1 and 2, a detected body 102 (dog), as the subject of detection and which causes pressure on said sensor 94, is affixed at a position roughly in the longitudinal center of this rod 98. This detected body 102 is mounted so as to move parallel relative to the sensor 94; because it moves along with the movement in the direction of the Z axis of the header body 39, it causes the position of movement to the second workpiece of said header body 39 to be detected by the sensor 94. With said means for advancing and retreating 20, said means for detecting 92, as a sensor, itself is moved forward towards the second workpiece 14 in synchronization with the forward movement of the torque converter TC as the first workpiece; meanwhile, this means for detecting 92 is affixed to an arbitrary standard position, the link between said means for detecting 92 and the first workpiece 12 is released, and the first workpiece only is moved forwards in a state with resilient energy applied; this allows for the phases to be brought into coincidence smoothly and precisely and for spline fitting to be effected in a short time. Because the design may be such that control of the servo mechanism, including each servo motor, with the only parameter being the position of the first workpiece with respect to the second workpiece, is effected with the mechanism for advancing, retreating, rotating, and maintaining 76, efficient design in a decreased period of time can be realized; moreover it is possible to use a single servo motor to drive the advancing and retreating in the direction of the second workpiece. Consequently, the entire device may be moved forwards and backwards on the basis of a single axis, therefore a device with a simple unified structure, without being moved in a state with the axis, bearings, and driving mechanism mounted on a table, can be realized. Moreover, because only a single servo motor is used as said means for advancing and retreating in the driving portion, the weight is greatly decreased and the size of the device becomes much more compact at the same time; manufacturing costs can also be reduced.

Moreover 104 in the figures shows a control panel of the control portion for integrated control of the servo mechanisms. The control portion detects the position in the direction of depth of the header body 39 supporting said means for holding 24 with said means for detection, responds to the state or presence of the fitting of the first and second workpieces at a set standard detection position, and controls the fore and aft and rotary servo motors 28 and 32 to move in concert as necessary.

In the embodiment, the standard detection position of said means for detecting 92 corresponding to the insertion fitting portions R, S, and T is set to a position moved further in the direction of insertion depth than the position reached first by each insertion fitting portion (position of initial contact of each fitting portion). This allows for the matching of phases in a short period of time because it is possible for spline phase matching to be effected while the first workpiece 12 is rotated in a state where resilient energy is applied, in other words in a state where it presses with flexibility, against the second workpiece 14, when effecting the insertion action with the rotary and forward and backward movement of the torque converter in each insertion fitting portion.

Also, as discussed above, said means for advancing and retreating 20 comprises a slider 22 supported advancably and retreatably with respect to the second workpiece 14 by a body portion 18, means for holding 24 connected to said slider 22 and holding the first workpiece 12, and means for applying resilient energy 42, comprising a spring, to provide a prescribed resilient energy between the slider 22 and said means for holding 24. Therefore, the first workpiece is inserted and fitted in the second workpiece while resilient pressure is continually applied; the fore and aft position as the direction of insertion depth is simply set with only the contact position; the position of both workpieces is fixed at that position, which becomes different when either workpiece is rotated while in that state; and phase agreement and fitting are effected smoothly and precisely because the fit is definite, without immediate air vibration if the phases agree. As a result, the cycle time for the action of insertion and assembly of these workpieces is shortened greatly.

Next, based on FIGS. 6 through 14, the action of the device for insertion and assembly of workpieces is explained while the method for insertion and assembly of workpieces relating to the embodiment is shown. FIG. 6 shows the state where the torque converter TC is moved forward into the converter housing 314 which holds the second workpiece and is at the first position of contact of the output axis 312 of the transmission and the spline engagement cylinder on the torque converter TC side in the first fitting portion R, with the torque converter (TC) adhered to and held by the adhesive pad 74. From this state, either workpiece (the first workpiece in the embodiment) is rotated in the state where the first workpiece is pressed against the second workpiece with the necessary pressing force applied continually from said means for applying resilient energy 42 in each insertion fitting portion from this state and spline phase agreement and fitting were effected precisely and quickly. FIG. 7 shows the state where fitting and insertion and assembly are complete for all the first, second and third insertion fitting portions R, S, and T.

The transmission TM as the second workpiece 14 is transported to the insertion and assembly position with a conveyor, not pictured, and positioned. Meanwhile, the device for insertion and assembly of workpieces 10 is arranged at a position opposite to this transmission TM and is set to advance and retreat so that the slider 22 faces said transmission. Then, from above the insertion and assembly device for example, the torque converter TC for assembly is lowered with a robot and adhered to and held with the adhesive pad 74 of the device 10. At this time, air is supplied to the brake device and releases the lock; the guide shaft 84 moves along with the advancing and retreating of the slider 22.

Figure 8:
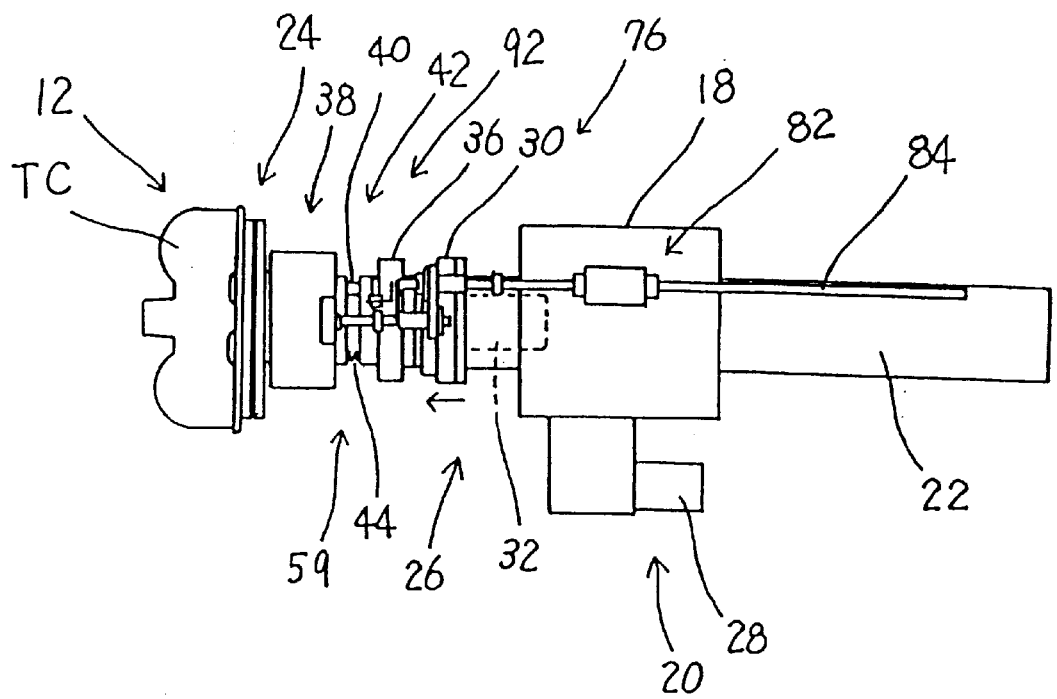
FIG. 8 is a diagram of the action of the device for insertion and assembly of workpieces.
Figure 9:
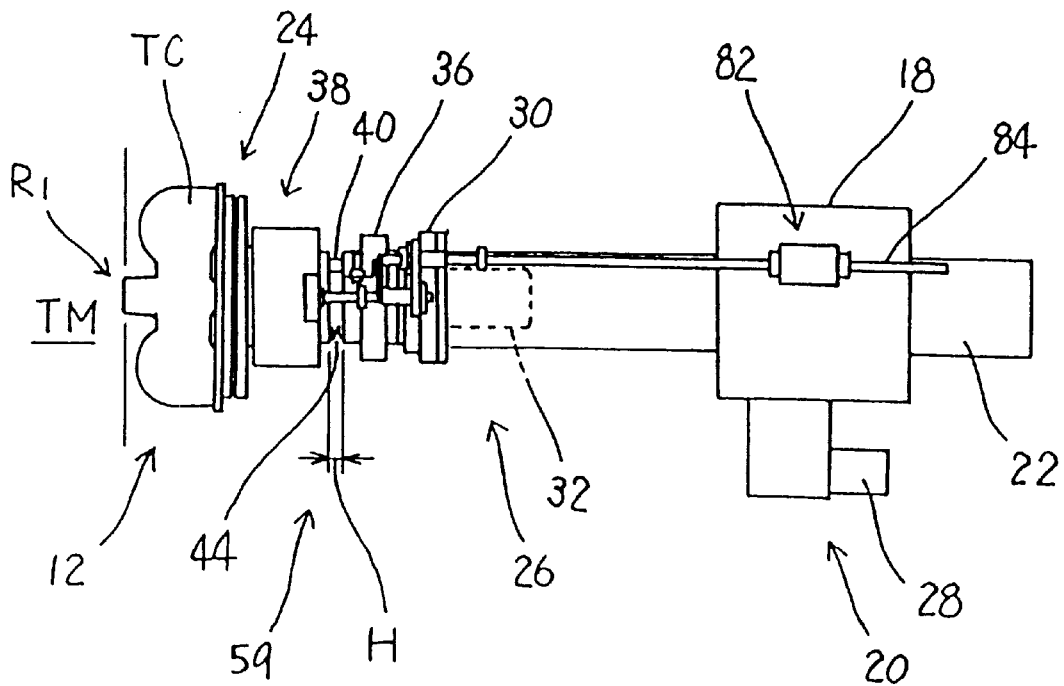
FIG. 9 is a diagram of the action of the device for insertion and assembly of workpieces.
Figure 10:
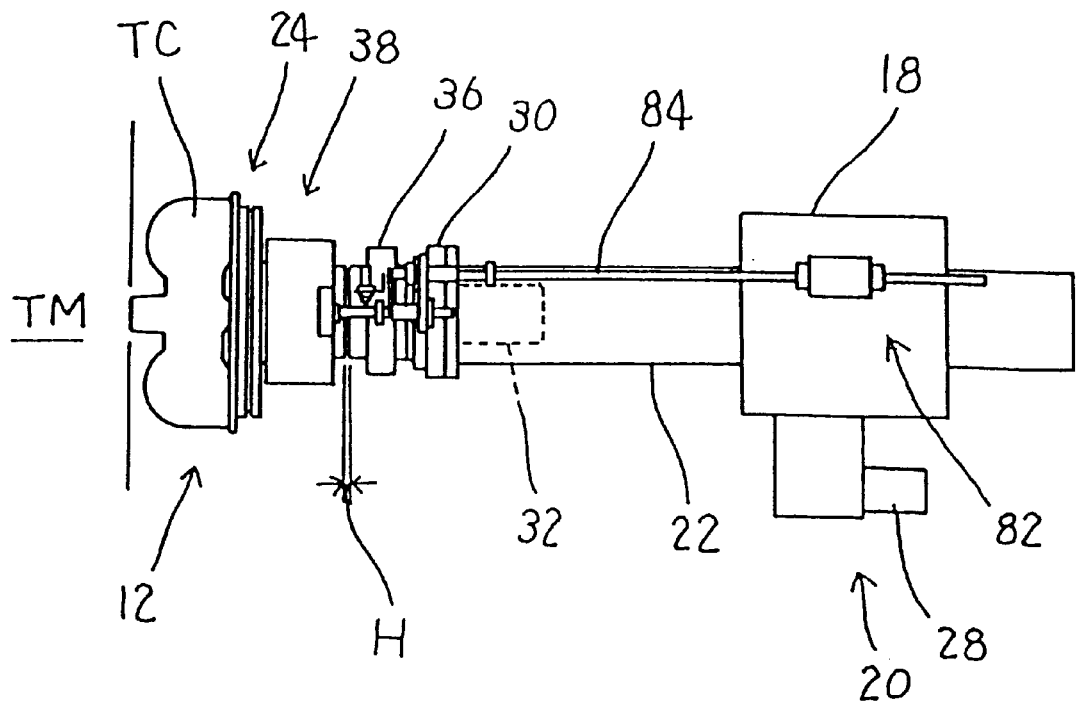
FIG. 10 is a diagram of the action of the device for insertion and assembly of workpieces.
Figure 11:
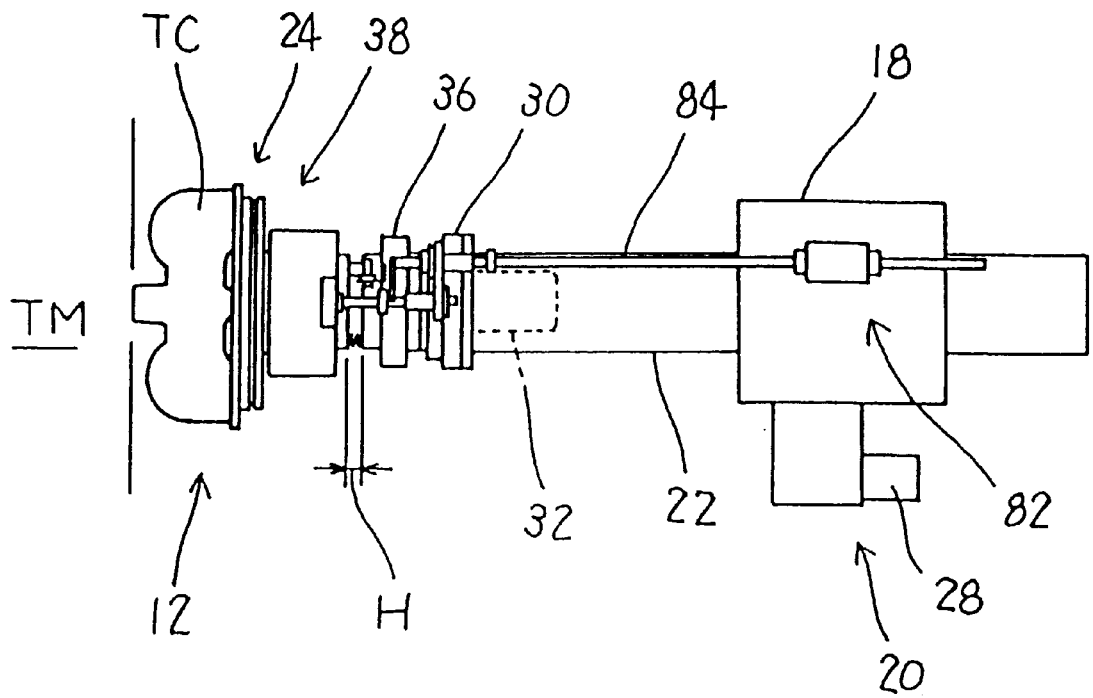
FIG. 11 is a diagram of the action of the device for insertion and assembly of workpieces.
Figure 13:
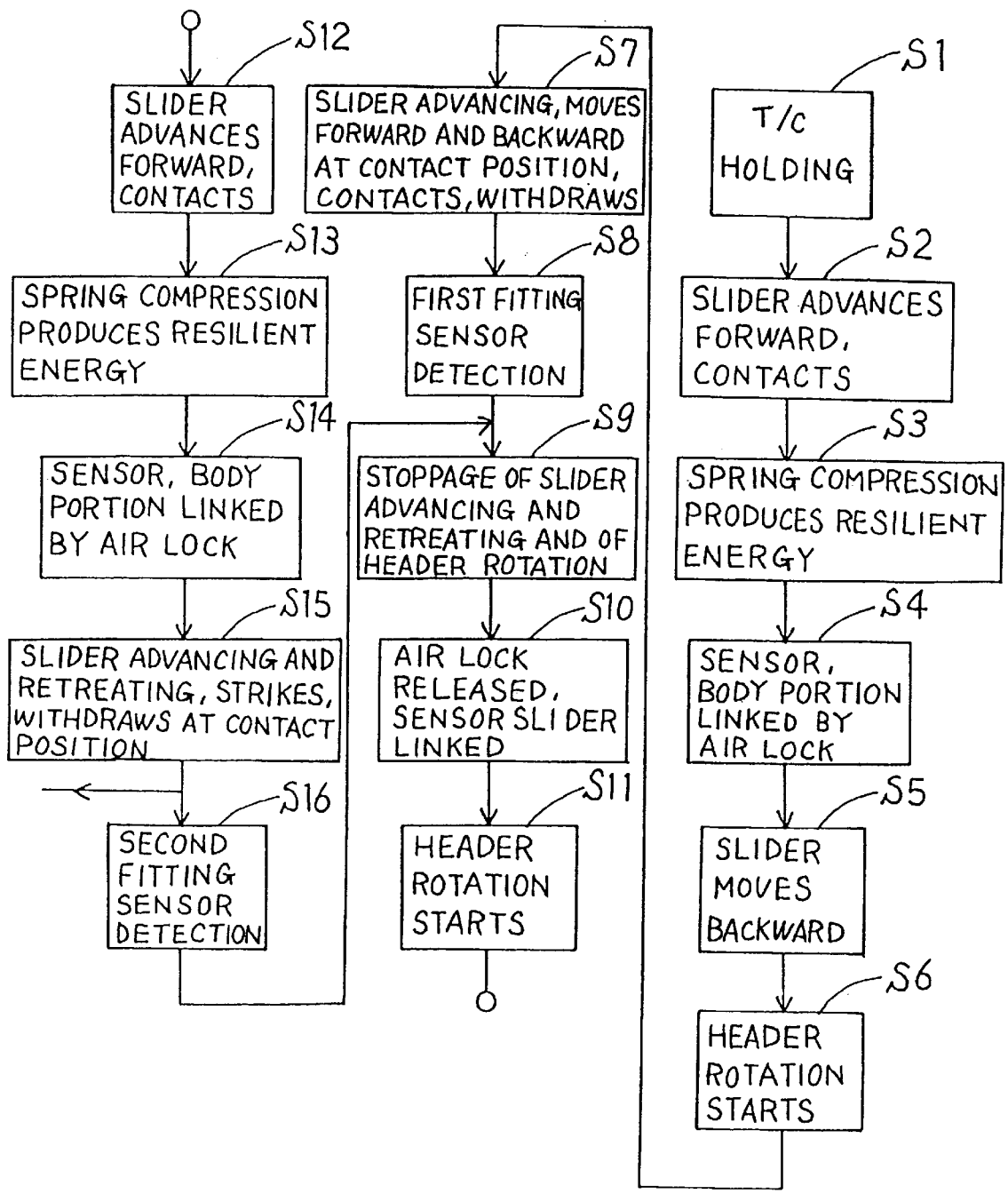
FIG. 13 is a flowchart of the insertion and assembly action of the device for insertion and assembly of workpieces.
Figure 14:
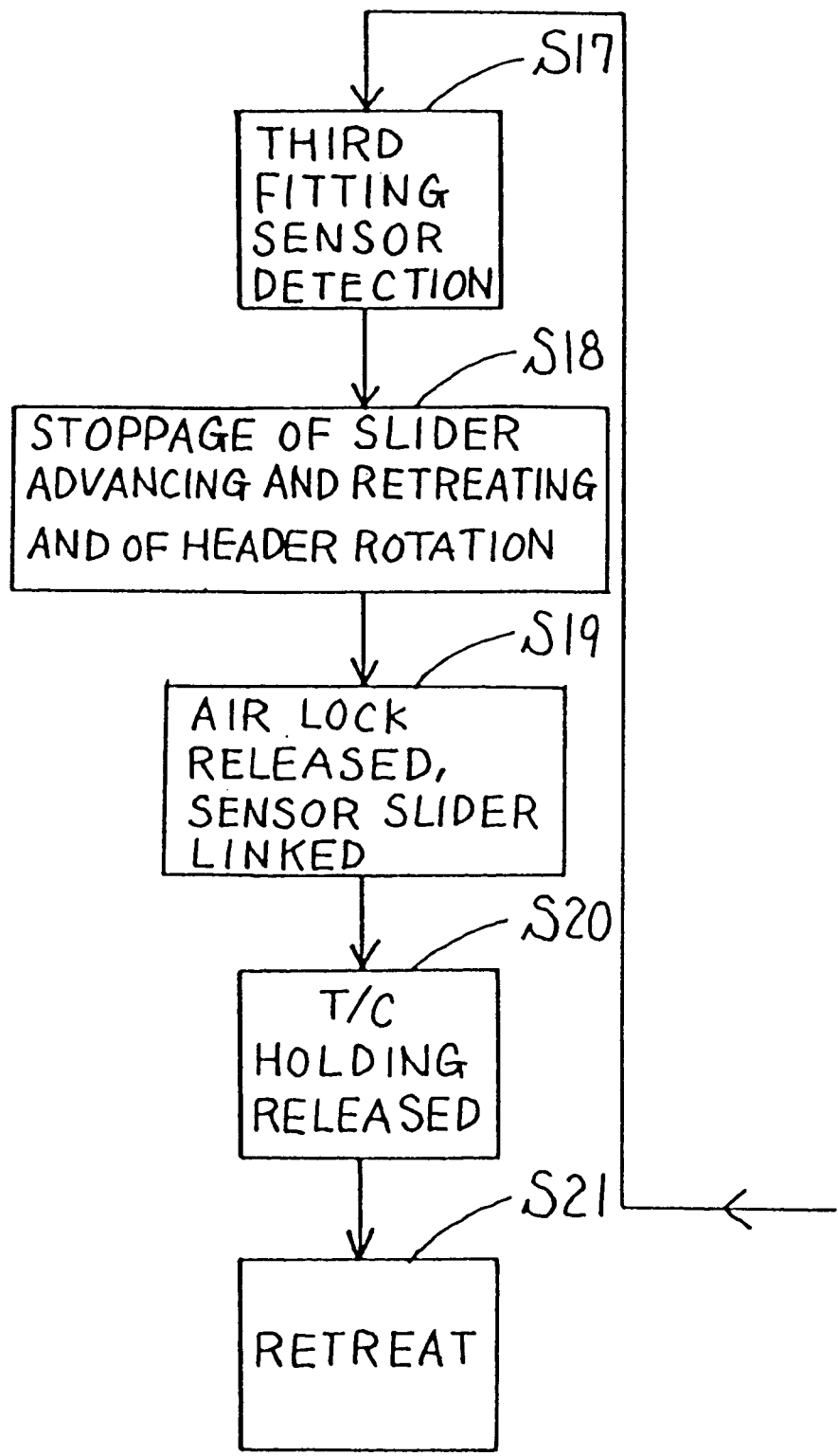
FIG. 14 is a flowchart of the insertion and assembly action of the device for insertion and assembly of workpieces.

In FIG. 13, in the state with the torque converter TC adhered and held in step S1, the slider 22 is in a position of converging with the side of the body portion 18 as shown in FIG. 8. From this state, in step S2 as shown in FIG. 9, the slider 22 moves toward the second workpiece and the torque converter TC and the output axis 312 of the transmission TM come into contact at the initial contact position of the first insertion fitting portion R. At this time, the guide shaft 84 is pushed by the slider 22 and moves forward in synchronization with the sensor 94 and the detected body 102. Then when the torque converter moves further forward from the contact position in step S3, the spring 44, as said means for applying resilient energy 42, is compressed and presses the torque converter TC by means of said means for holding 24 with the pressing force determined by the spring constant and the distance moved by the TC in the direction of compression. In other words, the resilient energy due to said means for applying resilient energy is set by the resilience constant and the pressing force to determine the distance the slider holding the first workpiece moves in the direction of the second workpiece. Then, it becomes for the slider to move forwards and backwards in small increments through numerical control due to being driven by the conversion of the rotation of the control motor to linear motion of the slider; this allows for a very small number of parts for driving the slider to cause the advance and retreat of said means for holding. Then in step S4, the sensor 94 detects the prescribed standard detection position at which the spring is compressed, causes a halt to the supply of air to the brake device 82 and the use of the brakes (FIG. 10), and restrains the guide shaft 84; whereupon the guide shaft 84 is restrained by the body portion 18 and stops at a position of an absolute distance from the body portion. In step S5, when the slider 22 is moved back an appropriate distance from this state, the slider 22 and said means for holding 24 move backwards with the sensor 94 stopped at the position of an absolute distance. Next, in step S6, the rotary block 36 is rotated and the torque converter TC is rotated by means of the header body 39. Then, in step S7, the slider 22 is moved forward and rotated in the state of being pressed toward the second workpiece with resilient energy applied at the initial contact position R1 at the first insertion fitting portion R, while the torque converter is moved forwards and backwards. This allows for insertion and fitting of the torque converter TC as the first workpiece without air vibration and spline phases agreeing precisely at the point of closest phase agreement. In this way, in step S8, the sensor detects the fitting state at the first insertion fitting portion when the detected body 102 and the sensor 94 separated by spring compression approach once more.

When fitting is effected at the first insertion fitting portion R, the forward and backward movement of the slider and the rotation of the header body 39, specifically the adhesive pad 74, are stopped in step 9. In step 10, air is supplied to the brake device 82, the brakes are released, and the guide shaft 84 is released from the constraint of the body portion 18. This allows the sensor 94 to comply with the movement of the slider once more. In Step 11 then, the rotation of the header body 39 is started.

When moving from the fitting state of the first insertion fitting portion to the second insertion portion, the slider 22 moves forward in step 12 and contacts the second initial contact position S1. When the slider then moves forward in step 13, it causes the compression of the spring 44, producing the resilient energy and effecting the pressing state. In step 14, at the standard detection position at the second insertion fitting portion, the air supply for the brake device 82 is stopped, air lock effected, the sensor restrained by the body portion 18, and the sensor 94 is stopped and held at a position of absolute distance. In this state in step 15, the slider 22 is moved forwards and backwards and the torque converter TC as the first workpiece is inserted in the transmission TM as the second workpiece due to the necessary pressing force and/or rotation. The phases are brought into agreement and in step 16, the sensor detects the fitting state of the second insertion fitting portion S. In this way, the action of shifting from the second to the third insertion fitting portion T effects the same actions as in Step S9 to S15.

Figure 12:
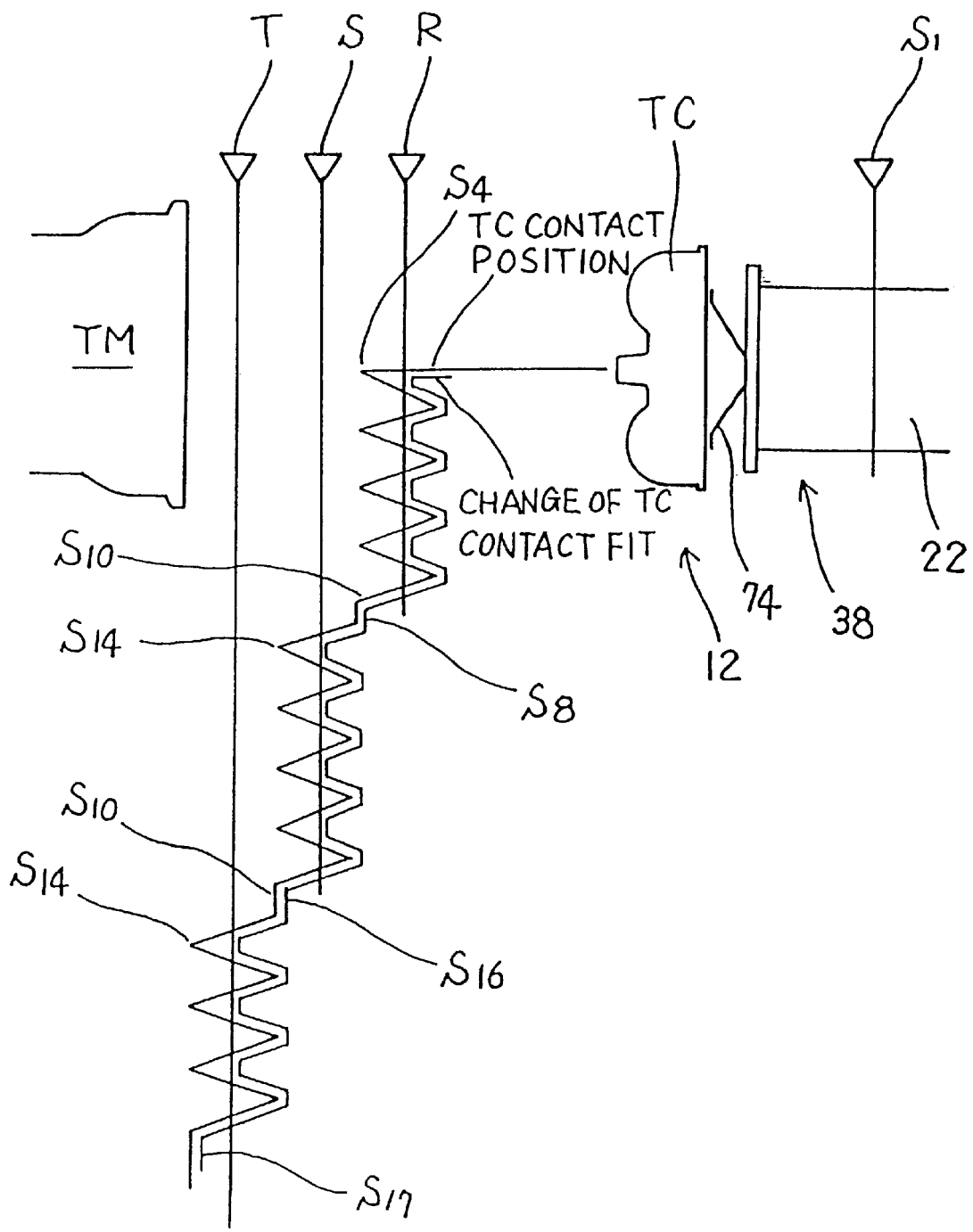
FIG. 12 is an explanatory diagram of the schematic action of the movement of the device for insertion and assembly of workpieces.

Then, when the third insertion fitting portion T is fit in step 17, the slider 22 stops moving forwards and backwards in step 18 and the header body 39 also stops rotating. Then in step 19, air is supplied to the brake device 82, the air lock is released, and the guide shaft 84 is released from the restraint of the body portion 18; in step 20, the negative pressure of the adhesive pad 74 is released, canceling the holding power for the torque converter, the slider 22 moves backwards (step 21) and awaits the process for holding the torque converter TC as the next first workpiece. FIG. 12 shows these actions graphically.

In this way, a method for assembling workpieces to assemble a first workpiece with a second workpiece is provided as a method for insertion and assembly of workpieces wherein means for holding to hold a first workpiece is placed in contact with a slider which moves advancably and retreatably with respect to a positioned second workpiece so as to apply the necessary resilient energy to the slider, and in the state with said resilient energy applied, the first workpiece is moved forwards and backwards with respect to the second workpiece while being rotated round an axis being the axis in the direction of advancing and retreating.

Also, said means for detecting is moved in the same direction as this first workpiece in synchronization with the forward movement of the first workpiece toward the second workpiece; the standard detection position for each of a plurality of insertion fitting portions established in the direction of insertion depth of these first and second workpieces may be set at the initial contact position or a nearby position for each insertion fitting portion. Then, the first workpiece may be assembled with the second workpiece when only the first workpiece is moved forwards and backwards while being rotated, in the state where only said means for detecting is stopped at said standard position, while the movement forwards and stoppage of said means for detecting is effected in the same direction as the first workpiece. The workpieces can be applied to the assembly of workpieces in other manufacturing lines, such as other types of precision machinery, automobile-related, shipping, steel, etc., as well as to the constitution of this embodiment.

The device for insertion and assembly of workpieces and method thereof relating to the present invention are not limited to the constitution of the embodiment discussed above and arbitrary improvements which do not depart from the essence of the invention according to the claims may be made.

As explained above, with the device for insertion and assembly of workpieces of the present invention, insertion and assembly conditions can be set simply by adjusting the resilient energy and the amount of movement of the slider and manufacturing costs can be greatly reduced and the device as a whole be made lightweight and compact, while enabling the simple setting of conditions even for workpieces with different fitting depths and other assembly conditions, and having a great capacity to correspond to machine type regardless of workpiece type and model, etc., because the device for insertion and assembly of workpieces, being a device for insertion and assembly of workpieces wherein a first workpiece is inserted and assembled in a positioned second workpiece, comprises means for advancing and retreating causing the advance and retreat of the first workpiece toward said second workpiece and means for rotating to rotate either workpiece around an axis being a line extending in the direction of advance and retreat of the first workpiece with respect to said second workpiece, and wherein said means for advancing and retreating comprises a slider supported advancably and retreatably with respect to the second workpiece by a body portion, means for holding connected to said slider and holding the first workpiece, and means for applying resilient energy to provide a prescribed resilient energy between the slider and said means for holding. Also, because of the phases being matched and fit precisely at the point closest to phase agreement, the time from insertion to fitting becomes very short, the insertion and fitting action can be effected smoothly, the cycle time in the assembly process shortened, and the total workpiece assembly time greatly reduced. Furthermore, a device which allows for simple setting of conditions and is at the same time small and lightweight results in it being possible to greatly improve the precision of positioning and the reliability of the operation.

Also, said slider is installed lengthwise in the form of a rail or cylinder; said means for holding is connected on one end of the slider. Therefore, the size of the device as a whole becomes compact and it is possible to achieve lightness of weight because the entire thing advances and retreats in a state of having said means for holding on one end. Then the lightness of weight results in good precision for the action during the insertion and assembly with a second workpiece in the state where the first workpiece is held with said means for holding, thereby making the assembly operation more accurate. Also, the workpiece space can be made small and working space can be used more efficiently because the action of inserting and assembling workpieces can be effected at an aerial position above the ground.

Also, said first and second workpieces comprise insertion fitting portions to be inserted together in the direction of insertion depth; and means for detecting to detect the presence of a fit with said insertion fitting portions is installed, as well as a mechanism for detecting fitting position causing the synchronized forward movement toward the second workpiece of said means for detecting itself, in a linkage with the forward movement of said first workpiece due to said means for advancing and retreating, while causing said means for detecting to be fixed at an arbitrary standard position, releasing the link between the first workpiece and said means for detecting, and causing the advance of only the first workpiece. Due to this, because the design has that control of the servo mechanism, including each servo motor, with the only parameter being the position of the first workpiece with respect to the second workpiece, efficient design in a decreased period of time can be realized; moreover, when a spring, for example, is used for resilient energy, the pressing force due to the spring is adjusted by the amount of forwards and backwards movement and by selecting springs corresponding to the spring constant; insertion speed and rotation speed can accordingly be set with flexibility, therefore the device can be quickly set to various conditions which differ for each type of workpiece and the startup time can be greatly decreased. Furthermore a device with only one servo motor to drive the forwards and backwards movement with respect to the second workpiece can be realized; therefore, the device as a whole can be constituted to move forwards and backwards on the basis of a single axis, allowing the device to be lightweight and compact.

Also, the device for insertion and assembly of workpieces may be equipped with a mechanism for advancing, retreating, rotating, and maintaining, which supports said means for holding rotatably, while withdrawing said means for holding and guiding and maintaining it advancably and retreatably with respect to said slider. Therefore, the entire device may be moved forwards and backwards on the basis of a single axis, therefore a device with a simple unified structure can be realized. Moreover, because only a single servo motor is used as said means for advancing and retreating in the driving portion, the weight is greatly decreased and the size of the device becomes much more compact at the same time; manufacturing costs can also be reduced.

Also, the standard detection position of means for detecting, corresponding to said insertion fitting portions, may be a position more displaced in the direction of the insertion depth than the initial contact position for each of the insertion fitting portions. Therefore, because said means for detecting is stopped and maintained at this detection position, the slider is moved forwards and backwards, and the insertion fitting action is effected, a mechanism for continually applying energy to the first workpiece can be realized with said means for applying resilient energy and the effectiveness of the speed and precision of fitting and phase matching is maintained.

Also, said means for advancing and retreating comprises a numerically controllable control motor and means for converting to convert the rotary force of the control motor into linear motion. Therefore, a structure may be attained wherein said means for rotating, etc., is enclosed in the rail-shaped or cylindrical slider and moves forwards and backwards in the direction of another workpiece with which to be assembled. Furthermore, the resilient energy, due to said means for applying resilient energy, is set with the resilience constant and the pressing force determined by the distance the slider supporting the first workpiece moves toward the second workpiece; as a result, in the case where said means for applying resilient force is constituted of a spring, for example, an appropriate amount of movement by the slider may be set numerically using springs with different spring constants. This makes the number of parts in the driving system very small and can keep production costs low, as well as simplify the structure.

Also, with the method for insertion and assembly of workpieces of the present invention, in the state where means for holding to hold a first workpiece is connected to a slider which moves advancably and retreatably with respect to a positioned second workpiece, so as to provide the necessary resilient energy to the slider, and applies the resilient energy, the first workpiece is moved forwards and backwards with respect to the second workpiece, while being rotated around an axis being an axis in the direction of advancing and retreating, and the first workpiece is assembled with the second workpiece. Therefore, the conditions of insertion and assembly can be set just by adjustment of the resilient energy and setting the amount of movement of the slider; and the setting of conditions, even for workpieces with different fitting depths and other assembly conditions, can be effected simply and with a great capacity to correspond to machine type regardless of workpiece type and model, etc. Also, because of the phases being matched and fit precisely at the point closest to phase agreement, the time from insertion to fitting becomes very short, the insertion and fitting action can be effected smoothly, the cycle time in the assembly process shortened, and the total workpiece assembly time greatly reduced.

Also, the method for insertion and assembly of workpieces of the present invention may be such that the assembly of the first workpiece to the second workpiece is effected as follows: said means for detecting is moved in the same direction as this first workpiece in synchronization with the forward movement of said first workpiece toward the second workpiece; the standard detection position of said means for detecting is set to the initial contact positions of each insertion fitting portion, or at positions in the vicinity thereof, being a plurality of levels established in the direction of insertion depth of the first and second workpieces; and the first workpiece only is moved forward and rotated, while the advance and stoppage of said means for detecting in the same direction as the first workpiece is effected, in a state where only said means for detecting is stopped at said standard position. Therefore, because the design allows for control of a servo mechanism comprising each servo motor with the only parameter being the position of the first workpiece with respect to the second workpiece, efficient design in a decreased period of time is realized. When a spring, for example is used for resilient energy, the pressing force due to the spring is adjusted by the amount of forwards and backwards movement and by selecting springs corresponding to the spring constant; insertion speed and rotation speed can accordingly be set with flexibility, therefore the device can be quickly set to various conditions which differ for each type of workpiece and the startup time can be greatly decreased.

Figure 15:
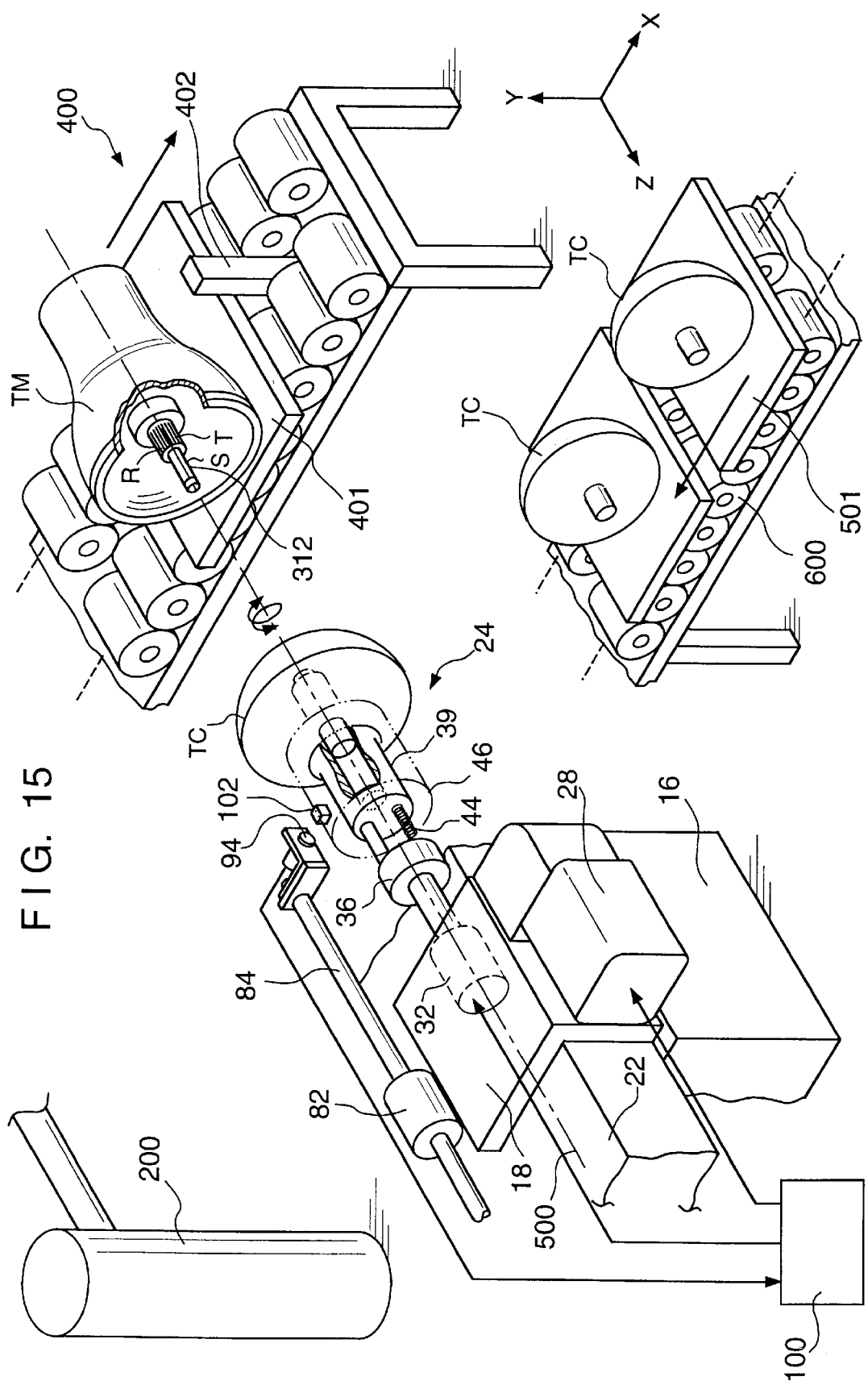
FIG. 15 is a perspective view showing the outer appearance showing the use state of a workpiece assembling apparatus.

FIG. 15 is a perspective view showing the outer appearance of a workpiece assembling apparatus together with a workpiece convey device and a robot device. The constituents already described above are denoted by the same reference numerals, and a detailed description thereof will be omitted. Unexplained portions and different arrangement portions will be described below.

A transmission TM coaxially having an inner spline shaft S and an outer spline shaft R is fixed on a pallet 401 and conveyed by a roller conveyor device 400 in a direction of an arrow in FIG. 15. The transmission TM is stopped by a stopper device 402 and then kept stationary by a holding device not shown.

A torque converter TC having a turbine wheel fitted on the inner spline shaft S and a stator fitted on the outer spline shaft R is fixed to a pallet 501 and conveyed by a roller conveyor device 600 in a direction of an arrow in FIG. 15. The torque converter TC is moved to a holding means 24 of the workpiece assembling apparatus with a hand (not shown) of the robot device 200 and is then held, as shown in FIG. 15.

Consequently, the torque converter TC opposes the transmission TM located at a predetermined position. The torque converter TC is spirally moved to come close to the transmission TM, so that the inner and outer spline shafts S and R are fitted in the spline holes of the turbine and stator.

To center the spline shafts of the transmission TM and the rotational axis of the turbine wheel to align with an axis 500, a mechanism (not shown) for driving a base unit 18 in the X and Y directions in FIG. 15 is incorporated in the base unit 18.

The base unit 18 has a guide (not shown) for guiding a moving table 22 in the Z-axis direction in FIG. 15, and the guide is driven by an advancing/retracting servo motor 28 serving as the first servo motor.

A rotary servo motor 32 shown by dotted line and working as the second servo motor is mounted on the moving table 22. A rotary block 36 working as a torque converter rotation means driven by the rotary servo motor 32 in the normal or reverse direction is fixed on the output shaft of the motor 32.

A coil spring 44 serving as an elastic member, which elastically deforms between the position of compression before fitting and the fitting position after fitting is interposed between the rotary block 36 and a bearing tube 46. The coil spring 44 transmits normal/reverse rotation to the header member 39 and allows axially moving the header member 39. The header member 39 has the holding means 24 for holding the torque converter TC in accordance with a method including the action of suction being arranged in the header member.

The dog (detected body) 102 to be detected by a sensor 94 constructed of a proximity switch fixed to the end portion of a guide shaft 84 is fixed to the bearing tube 46 in the manner as described above.

The bearing disposed in the base unit 18 holds the guide shaft 84 to advance or retract it together with movement of the moving table 22. After the transmission and torque converter are moved to the position to be fitted, compressed air is supplied to a brake device 82 as described above, thereby keeping the guide shaft 84 in a stationary state.

Figure 16A:
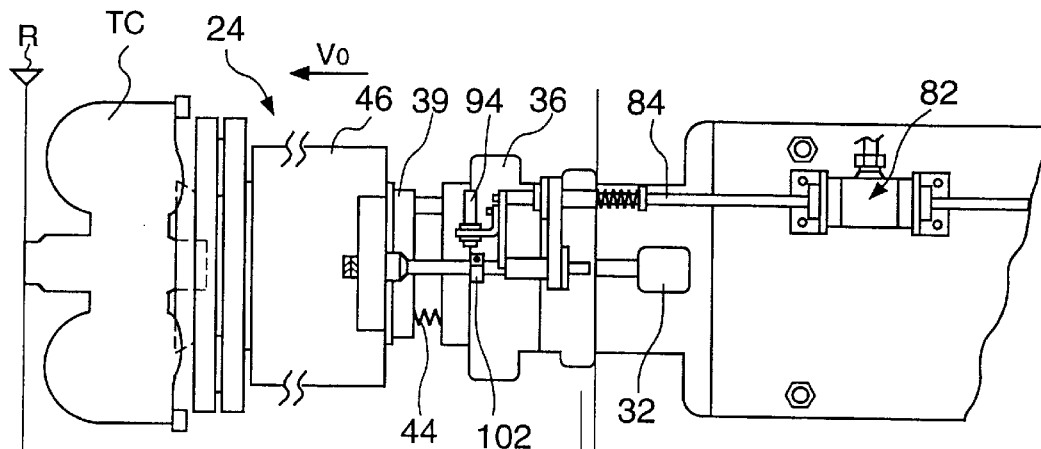
FIG. 16A is a plan view showing the state in which a torque converter TC is moved to the initial contact position of a transmission TM.
Figure 16B:
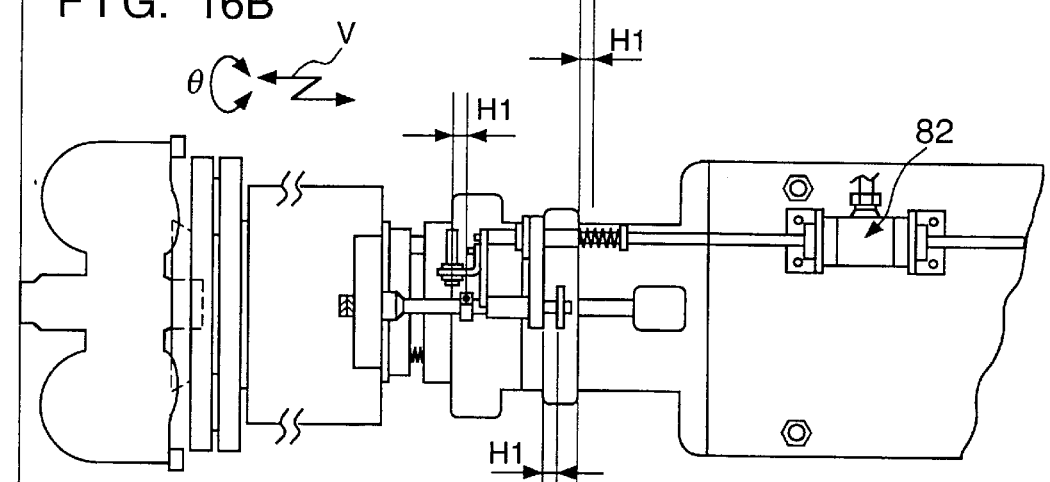
FIG. 16B is a plan view showing the state in which the torque converter TC is moved to the position to be fitted.
Figure 16C:
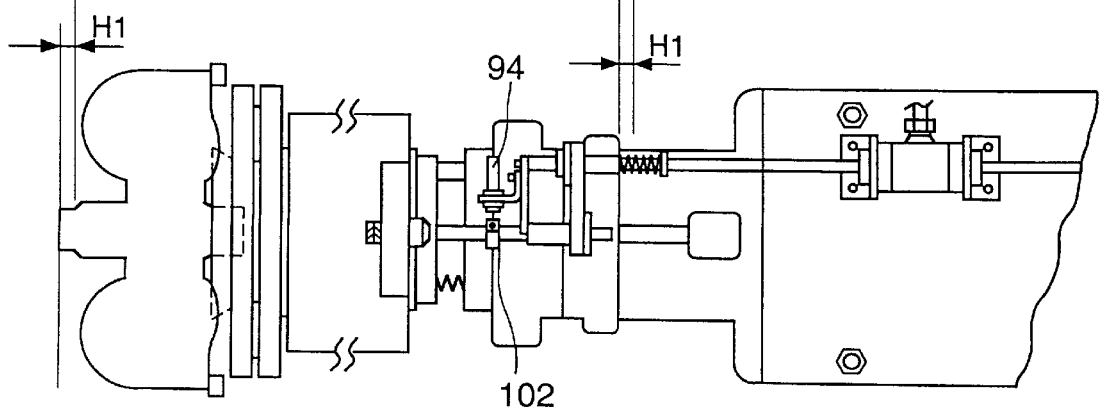
FIG. 16C is a plan view showing the state in which the torque converter TC is moved to the fitting end position.
Figure 17:
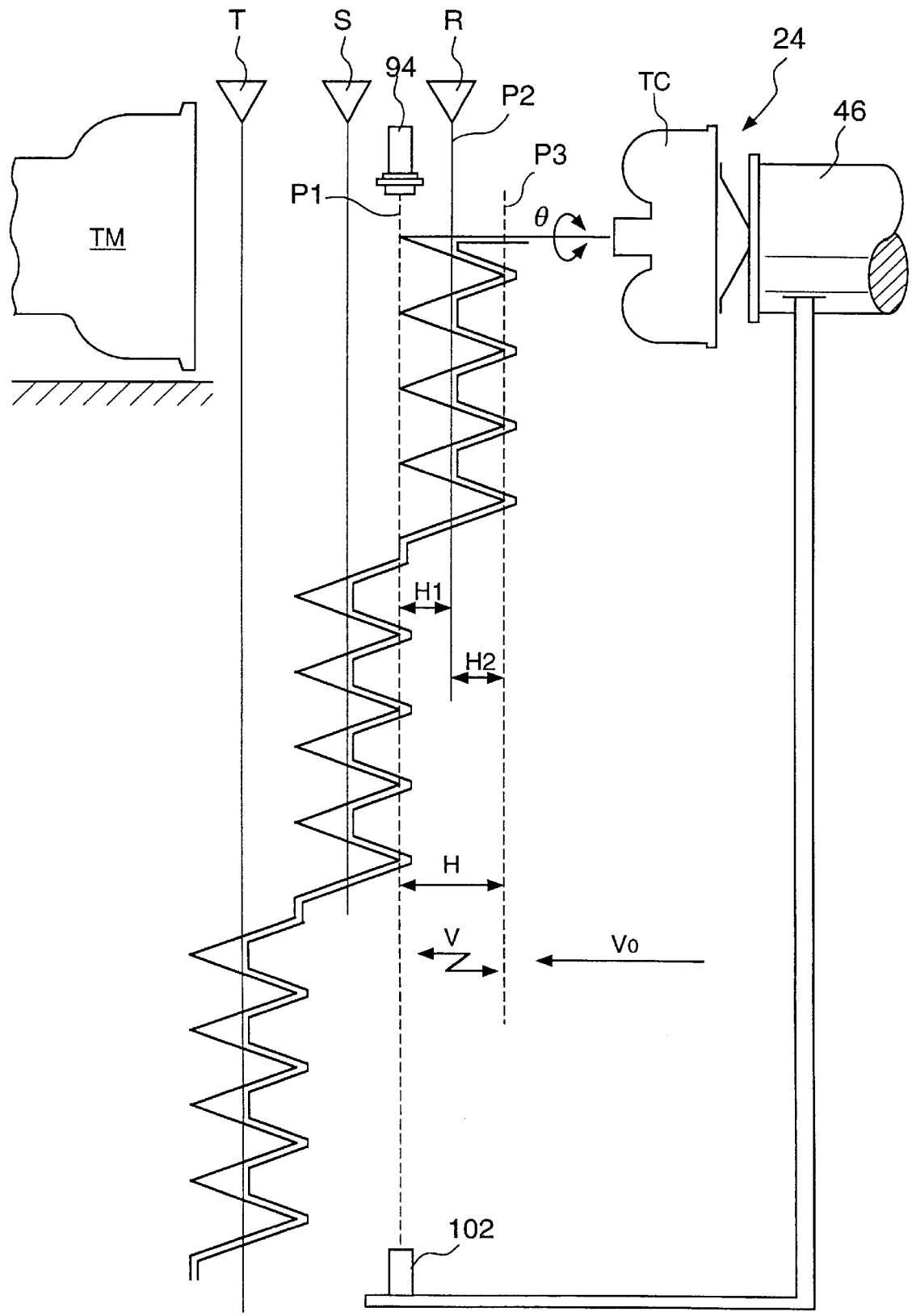
FIG. 17 is a developed view showing the fitting state between the transmission and torque converter.

With the above structure, the fitting operation will be described with reference to the plan views showing the fitting state of the torque converter TC in FIGS. 15 and 16A to 16C and the developed view showing the fitting state between the transmission and torque converter in FIG. 17.

The transmission TM having the inner and outer spline shafts S and R is held at the predetermined position. The torque converter TC containing torque converter oil to a predetermined level for torque transmission is gripped by the hand of the robot device 200 and transferred to the holding means 24. The mechanism of the base unit 16 is actuated so as to center the turbine wheel and the spline shafts of the stator at a time when the new kind of torque converter TC is assembled. After the centering of the first work is done, the centering operation of the next work is not taken place.

Upon completion of fitting preparation, the advancing/retracting servo motor 28 is actuated to move the moving table 22 horizontally at a moving speed V0. At this time, the sensor 94 moves together with the moving table 22 to the fitting end position in FIG. 17 and is held stationary by the brake device 82 at a sensor position P1 indicated by the broken line in FIG. 17. On the other hand, the torque converter TC is moved to the first contact position P2 at the moving speed V0. If fitting is successful, the fixed dog 102 moves from the bearing tube 46 to the sensor position P1 to confirm the success of fitting. The next fitting operation for the spline shaft S is then performed.

If the first fitting is unsuccessful, the moving table 22 is returned to a return position P3 indicated by the broken line. Meshing between the distal end portion of the torque converter TC and the transmission is released to allow rotating the torque converter TC. The return position P3 has a gap H2 from the contact position P2 so as to release meshing between the torque converter TC and the transmission TM.

As described above, fitting is retried by advancing/retracting screw movement achieved by both the advancing/retracting movement at an advancing/retracting speed V in the range of a distance H as the sum of a push amount H1 which is the distance from the sensor position P1 to the contact position P2 and the gap H2 and by normal/reverse rotation in the range of the angle θ. During this retry, the coil spring 44 is compressed to apply compression force in the fitting direction, as shown in FIG. 16B.

As described above, when fitting is successful, the fixed dog 102 is moved toward the bearing tube 46, thus moving the sensor to position P1 to confirm the success of fitting. The next fitting between the spline shaft S is performed and the fitting portion T is performed.

In the device of insertion and assembly of workpieces having the above structure, since the first and second servo motors being servo controlled are used, the device can flexibly cope with changes in types of torque converters TC and transmissions TM. Settings for the above screw movement can be arbitrarily performed.

Figure 18:
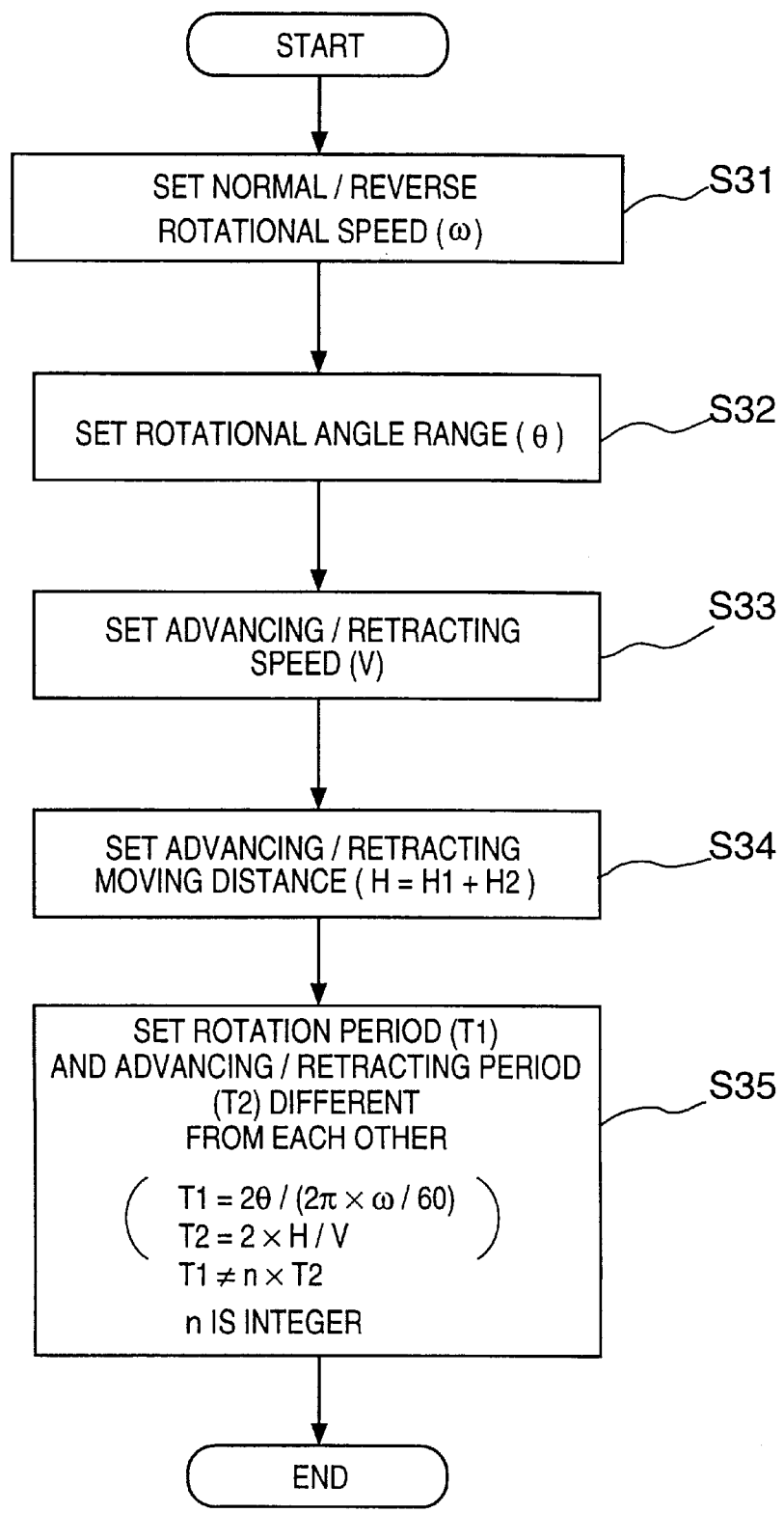
FIG. 18 is a flow chart for initial setting.

FIG. 18 is a flow chart for setting preset values in a controller 100. These values change upon changes in types of torque converter and transmission.

In step S31, a normal/reverse rotational speed ω of the rotary servo motor 32 is set within the range of 50 to 200 rpm. In step S32, the normal/reverse rotational angle of the rotary servo motor 32 is set to $\pi/2$ to $\pi$ rad. In step S33, the advancing/retracting speed V of the advancing/retracting servo motor 28 is set to several meters/sec. Although not shown, the moving speed V0 is an appropriate speed because constant-speed movement is performed until the torque converter comes into contact with the transmission for the first time.

The advancing/retracting moving distance H is the sum of the push amount H1 and the gap H2. The push amount H1 is a distance of movement of the sensor 94 after the torque converter is brought into contact with the transmission and can be set within the range of 10 to 20 mm. The gap H2 is similarly set within the range of 0.5 to 2 mm.

In step S35, the period T1 for normal/reverse rotation at the normal/reverse rotational speed ω is set not to synchronize with the period T2 for advancing/retracting movement at the advancing/retracting speed V. For example, these periods are set to be different for the fitting positions R, S, and T described above, so that meshing of different meshing portion will be realized. The chance for fitting can increase upon assuring asynchronism and randomness.

As many apparently widely different embodiments of the present invention can be made without departing from the spirit and scope thereof, it is to be understood that the invention is not limited to the specific embodiments thereof except as defined in the appended claims.

What is claimed is:

1. A workpiece assembling apparatus for locating a transmission at a predetermined position and moving a torque converter to come close to said transmission to fix said torque converter and transmission in order to assemble said transmission coaxially having inner and outer spline shafts with said torque converter having a turbine wheel fitted on said inner spline shaft and a stator fitted on said outer spline shaft, comprising:

positioning base means for initially aligning a rotational axis of said turbine wheel and stator with a rotational axis of said inner and outer spline shafts of said transmission held at the predetermined position;

a base unit mounted on said positioning base means;

a moving table horizontally coming close to or separating from said transmission by driving a torque converter holding means by a first servo motor arranged on said base unit, said torque converter holding means holding said turbine wheel and said stator to oppose said inner and outer spline shafts;

torque converter rotation means driven by a second servo motor mounted on said moving table to rotate said torque converter holding means about the rotational axis of said turbine wheel in a normal/reverse direction;

elastic means disposed between said torque converter rotation means and said torque converter holding means, said elastic mean being elastically deformable between a first compression position and a second fitting position;

detection means including a detector moved together with said moving table to the fitting position where said torque converter is fitted to said transmission, and then stopped and another detector arranged in said torque converter holding means, said detection means detecting a state after fitting; and control means connected to said detection means, said first servo motor, and said second servo motor, wherein advancing/retracting movement of said moving table cooperates with normal/reverse rotation of said torque converter rotation means to fit said torque converter with said transmission within a short period of time.

2. The apparatus according to claim 1, wherein said detection means comprises:

a shaft member held to advance or retract by a bearing mounted in said base unit and kept stationary at a position where said torque converter is to be fitted to said transmission;

said one detector fixed to an end portion of said shaft member; and said other detector arranged in said torque converter holding means and detected by said sensor.

3. A workpiece assembling method for locating a transmission at a predetermined position and moving a torque converter to come close to said transmission to fix said torque converter and transmission in order to assemble said transmission coaxially having inner and outer spline shafts with said torque converter having a turbine wheel fitted on said inner spline shaft and a stator fitted on said outer spline shaft, said method comprising the steps of:

keeping said transmission at the predetermined position;

aligning a rotational shaft of said turbine wheel with a rotational shaft of said inner and outer spline shafts by a positioning base means;

providing advancing/retracting movement by horizontally moving said torque converter by a moving table to come close to or separate from said transmission by driving said moving table with a first servo motor mounted on a base unit mounted on said positioning base means;

holding said turbine wheel and said stator to oppose said inner and outer spline shafts by torque converter holding means mounted on said moving table;

providing normal/reverse rotation by rotating said torque converter holding means about the rotational axis of said turbine wheel in a normal/reverse direction by torque converter rotation means driven by a second servo motor mounted on said moving table;

providing an elastic member disposed between said torque converter rotation means and said torque converter holding means the elastic member elastically deforming between a first compression position before fitting and a second fitting position after fitting;

detecting a state after fitting said torque converter with said transmission by a detector including one detector moved together with said moving table to the fitting position where said torque converter is fitted to said transmission, and then stopped and an other detector arranged in said torque converter holding means; and controlling the keeping step, the alignment step, the advancing/retracting movement step, the holding step, the normal/reverse rotation step, the compression step, and the detection step by control means connected to said detection means and the first and second servo motors.

4. The method according to claim 3, further comprising the step of changing at least one of a normal/reverse rotational speed at which said torque converter holding means rotates about the rotational axis of said turbine wheel in the normal/reverse direction, a normal/reverse rotational angle at which said torque converter holding means rotates about the rotational axis of said turbine wheel in the normal/reverse direction, an advancing/retracting speed at which said torque converter horizontally comes close to or separates from said transmission by said moving table, and a distance at which said torque converter horizontally comes close to or separates from said transmission by said moving table, in accordance with different types of said transmission and torque converter.

5. The method according to claim 4, wherein a probability of fitting between said transmission and said torque converter when simultaneously performing the advancing/retracting movement step for advancing/retracting movement by said moving table and the normal/reverse rotation step for said torque converter rotation means is increased by setting a normal/reverse rotation period at the normal/reverse rotational speed different from an advancing/retracting movement period at the advancing/retracting speed so as not to synchronize the normal/reverse rotation period and the advancing/retracting movement period.

6. A workpiece assembling apparatus for locating a transmission at a predetermined position and moving a torque converter to come close to said transmission to fix said torque converter and transmission in order to assemble said transmission coaxially having inner and outer spline shafts with said torque converter having a turbine wheel fitted on said inner spline shaft and a stator fitted on said outer spline shaft, comprising:

positioning base means for initially aligning a rotational axis of said turbine wheel and stator with a rotational axis of said inner and outer spline shafts of said transmission held at the predetermined position;

a base unit mounted on said positioning base means;

a moving table horizontally coming close to or separating from said transmission by driving a torque converter holding means by a first servo motor arranged on said base unit, said torque converter holding means holding said turbine wheel and said stator to oppose said inner and outer spline shafts;

torque converter rotation means driven by a second servo motor mounted on said moving table to rotate said torque converter holding means about the rotational axis of said turbine wheel in a normal/reverse direction;

elastic means obtaining a compressed state between an advanced end position for fitting and a retracted end position for retrying, while said torque converter is contacting with said transmission;

detection means constructed of one detector moved together with said moving table to three different positions where said torque converter is fitted to said transmission, said detector is stopped by brake means at said three different positions for detecting fitting state, and a detecting member fixed to said torque converter holding means so that said member is detected by said detected by said detector; and control means connected to said detection means, said first servo motor, and said second servo motor, wherein advancing/retracting movement of said moving table cooperates with normal/reverse rotation of said torque converter rotation means to fit said torque converter with said transmission within a short period of time at said three different positions.

7. The apparatus according to claim 6, wherein said detection means comprises:

a shaft member held to advance or retract by a bearing including said brake means and mounted on said base unit and kept stationary at said three different positions where said torque converter is fitted to said transmission;

said one detector fixed to an end portion of said shaft member; and said detecting member fixed on said torque converter holding means.

8. A workpiece assembling method for locating a transmission at a predetermined position and moving a torque converter to come close to said transmission to fix said torque converter and transmission in order to assemble said transmission coaxially having inner and outer spline shafts with said torque converter having a turbine wheel fitted on said inner spline shaft and a stator fitted on said outer spline shaft, said method comprising the steps of:

keeping said transmission to the predetermined position;

aligning a rotational shaft of said turbine wheel with a rotational shaft of said inner and outer spline shafts with an initially positioning base means;

providing advancing/retracting movement by horizontally moving said torque converter by a moving table to come close to or separate from said transmission by driving said moving table with a first servo motor mounted on a base unit mounted on said positioning base means;

holding said turbine wheel and said stator to oppose said inner and outer spline shafts by torque converter holding means mounted on said moving table;

providing normal/reverse rotation by rotating said torque converter holding means about the rotational axis of said turbine wheel in a normal/reverse direction by torque converter rotation means driven by a second servo motor mounted on said moving table;

compressing an elastic member between an advanced end position for fitting and a retracted end position for retrying, while said torque converter is contacting with said transmission;

detecting a state after fitting said torque converter with said transmission by a detector including one detector element moved together with said moving table to three different positions where said torque converter is fitted to said transmission, and then stopped and another detector element arranged in said torque converter holding means; and controlling the alignment step, the advancing/retracting movement step, the holding step, the normal/reverse rotation step, the compression step, and the detection step by control means connected to said detection means and first and second servo motors, said control step further comprising changing at least one of a normal/reverse rotational speed at which said torque converter holding means rotates about the rotational axis of said turbine wheel in the normal/reverse direction, a normal/reverse rotational angle at which said torque converter holding means rotates about the rotational axis of said turbine wheel in the normal/reverse direction, an advancing/retracting speed at which said torque converter horizontally comes close to or separates from said transmission by said moving table, and a distance at which said torque converter horizontally comes close to or separates from said transmission by said moving table.

9. The method according to claim 8, wherein a probability of fitting between said transmission and said torque converter when simultaneously performing the advancing/retracting movement step for advancing/retracting movement by said moving table and the normal/reverse rotation step for said torque converter rotation means is increased by setting a normal/reverse rotation period at the normal/reverse rotational speed different from an advancing/retracting movement period at the advancing/retracting speed so as not to synchronize the normal/reverse rotation period and the advancing/retracting movement period.

10. The method according to claim 8, wherein, in accordance with different types of said transmission and said torque converter, said control step changes at least one of a normal/reverse rotational speed at which said torque converter holding means rotates about the rotational axis of said turbine wheel in the normal/reverse direction, a normal/reverse rotational angle at which said torque converter holding means rotates about the rotational axis of said turbine wheel in the normal/reverse direction, an advancing/retracting speed at which said torque converter horizontally comes close to or separates from said transmission by said moving table, and a distance at which said torque converter horizontally comes close to or separates from said transmission by said moving table.

* * * * *